United States Patent
Stewart et al.

(10) Patent No.: US 10,640,395 B2
(45) Date of Patent: May 5, 2020

(54) FUNCTIONALIZED SURFACES FOR THE DESTRUCTION OF PATHOGENS AND ORGANICS

(71) Applicant: National Technology & Engineering Solutions of Sandia, LLC, Albuquerque, NM (US)

(72) Inventors: Thomas Austin Stewart, Albuquerque, NM (US); May D. Nyman, Corvallis, OR (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 0 days.

(21) Appl. No.: 16/168,501

(22) Filed: Oct. 23, 2018

(65) Prior Publication Data

US 2019/0055138 A1    Feb. 21, 2019

Related U.S. Application Data

(62) Division of application No. 13/720,643, filed on Dec. 19, 2012, now Pat. No. 10,155,674.

(Continued)

(51) Int. Cl.
*C02F 1/28* (2006.01)
*B01D 69/14* (2006.01)
(Continued)

(52) U.S. Cl.
CPC .............. *C02F 1/285* (2013.01); *B01D 69/02* (2013.01); *B01D 69/145* (2013.01); *C02F 1/288* (2013.01); *B01D 67/0088* (2013.01); *B01D 67/0093* (2013.01); *B01D 2257/91* (2013.01); *B01D 2325/14* (2013.01); *B01J 20/0211* (2013.01); *B01J 20/06* (2013.01); *B01J 20/3204* (2013.01); *B01J 20/3219* (2013.01);

(Continued)

(58) Field of Classification Search
CPC .......... B01D 2257/91; B01D 2253/106; B01D 2253/112; B01D 15/00; B01D 15/322; B01D 15/325; B01D 15/361; B01D 2323/30; B01D 67/0088; B01D 67/0093; B01J 20/3219; B01J 20/3204; B01J 20/0211; B01J 20/06; B01J 20/3242; B01J 20/3285; B01J 20/3248; C02F 1/285; C02F 1/288; C02F 2303/04; C02F 2305/10

See application file for complete search history.

(56) References Cited

U.S. PATENT DOCUMENTS

| | | |
|---|---|---|
| 5,589,396 A | 12/1996 | Frye et al. |
| 7,494,640 B1 | 2/2009 | Nyman et al. |
| 2003/0022216 A1 | 1/2003 | Mao et al. |

OTHER PUBLICATIONS

Stewart, T. A. et al., "Enhanced Water Purification: A Single Atom Makes a Difference," Environ. Sci. Technol. (2009) 43:5416-5422.

(Continued)

*Primary Examiner* — Pranav N Patel
(74) *Attorney, Agent, or Firm* — Daniel J. Jenkins

(57) ABSTRACT

The disclosure is directed to a surface having a binding component applied thereto for the adsorption or capture of pathogens and organic molecules or materials. The surface may be a component of a porous or nonporous substrate. The binding component may also bind a photocatalyst to the surface for photocatalytic destruction of the captured pathogens and organic molecules or materials.

3 Claims, 18 Drawing Sheets

Related U.S. Application Data

(60) Provisional application No. 61/577,349, filed on Dec. 19, 2011.

(51) Int. Cl.

| | | |
|---|---|---|
| *B01D 69/02* | (2006.01) | |
| *B01J 20/02* | (2006.01) | |
| *B01J 20/32* | (2006.01) | |
| *B01D 67/00* | (2006.01) | |
| *B01J 20/06* | (2006.01) | |

(52) U.S. Cl.
CPC ........ *B01J 20/3242* (2013.01); *B01J 20/3248* (2013.01); *B01J 20/3285* (2013.01); *C02F 2303/04* (2013.01); *C02F 2305/10* (2013.01)

(56) References Cited

OTHER PUBLICATIONS

Stewart, T. A. et al., "Delaminated titanate and peroxotitanate photocatalysts," Applied Catalysis B: Environmental (2011)105:69-76.

Liu, S. et al., "Functional Polyoxometalate Thin Films via Electrostatic Layer-by-Layer Self-Assembly," Journal of Cluster Science (2003) 14(3):405-419.

Janowski, F. et al., "Aminopropylsilane Treatment for the Surface of Porous Glasses Suitable for Enzyme Immobilisation," J. Chem. Tech. Biotechnol. (1991) 51:263-272.

Ding, X. et al., "Formation of supra-amphiphilic self-cleaning surface through sun-illumination of titania-based nanocomposite coatings," Surface & Coatings Technology (2010) 205:2554-2561.

Green, M. et al., "The Synthesis of Silica Nanospheres Doped with Polyoxometalates," J. Am. Chem. Soc. (2005) 127:12812-12813.

Kahraman, M. V. et al., "α-Amylase immobilization on functionalized glass beads by covalent attachment," Food Chemistry (2007) 104:1385-1392.

Okun, N. M. et al., "Polyoxometalates on Cationic Silica Nanoparticles. Physiochemical Properties of an Electrostatically Bound Multi-Iron Catalyst," Chem. Mater. (2004) 16:2551-2558.

Wang, B. et al., "Preparation Parameter Development for Layer-by-Layer Assembly of Keggin-type Polyoxometalates," Langmuir (2007) 23:11120-11126.

Vidal, M. et al., "Flourescence IgG immunosensor based on a micro flow cell containing controlled pore glass as immobilisation support," The Analyst (2000) 125:1387-1391.

Kim, T. W. et al., "Improved photocatalytic activity and adsorption ability of mesoporous potassium-intercalated layered titanate," Journal of Photochemistry and Photobiology A: Chemistry (2009) 205:173-178.

Akieh, M. N. et al., "Preparation and characterization of sodium iron titanate ion exchanger and its application in heavy metal removal from waste waters," Journal of Hazardous Materials (2008) 152:640-647.

Tanaka, T. et al., "Oversized Titania Nanosheet Crystallites Derived from Flux-Grown Layered Titanate Single Crystals," Chem. Mater (2003) 15:3564-3568.

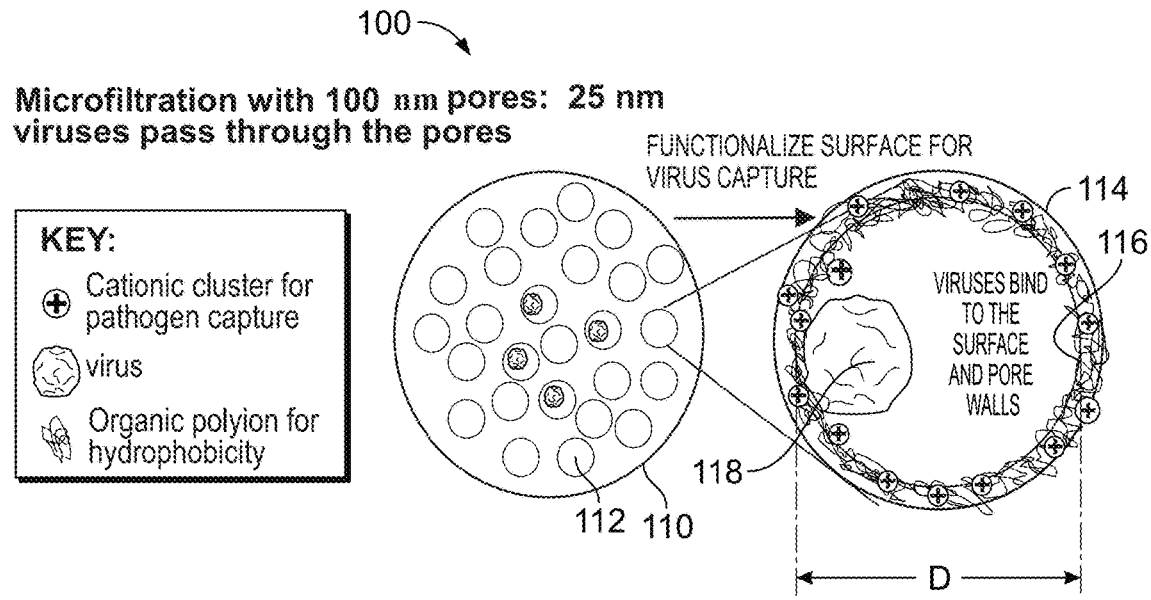
FIG. 1
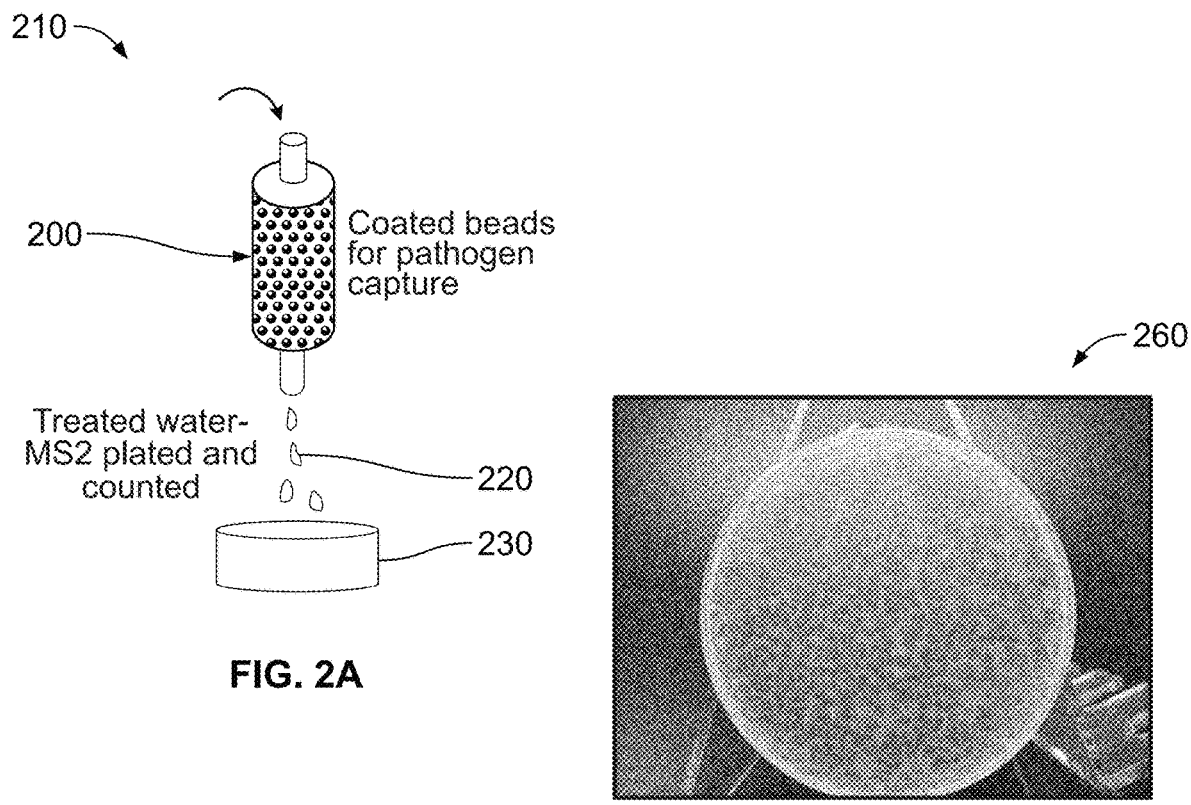
FIG. 2A
FIG. 2B

| Pair | Horizontal Dist. | Vertical Dist. | Surface Dist. |
|---|---|---|---|
| 0 | 25.440 (nm) | 12.940 (nm) | 29.678 (nm) |
| 1 | 44.031 (nm) | 12.312nm) | 47.528 (nm) |
| 2 | 53.816 (nm) | 11.024(nm) | 56.566 (nm) |

FUNCTIONALIZED SURFACES FOR THE DESTRUCTION OF PATHOGENS AND ORGANICS

CROSS-REFERENCE TO RELATED APPLICATIONS

This application is a divisional of prior U.S. application Ser. No. 13/720,643, filed Dec. 19, 2012, and claims the benefit of U.S. Provisional Patent Application 61/577,349, entitled "FUNCTIONALIZED SURFACES FOR THE DESTRUCTION OF PATHOGENS AND ORGANICS," filed Dec. 19, 2011, both of which are incorporated herein by reference in their entireties.

RELATED APPLICATIONS

The present disclosure is related to U.S. patent application Ser. No. 13/253,964 filed Oct. 6, 2011, titled "Biomimetic Membranes and Methods of Making Biomimetic Membranes," which is hereby incorporated by reference in its entirety.

STATEMENT OF GOVERNMENT INTEREST

The United States Government has rights in this invention pursuant to Contract No. DE-AC04-94AL85000 between the United States Department of Energy and Sandia Corporation, for the operation of the Sandia National Laboratories and Contract No. DE-NA0003525 awarded by the United States Department of Energy/National Nuclear Security Administration. The U.S. Government has certain rights in this invention.

FIELD

The present disclosure is generally directed to functionalized surfaces, and is more particularly directed to functionalized surfaces for the capture and/or photocatalytic destruction of pathogens and organics.

BACKGROUND

Fresh water supplies are becoming alarmingly scarce in the face of a growing population that demands a high standard of living. Water availability is impacted by both increased discharge of waste into the environment and faster depletion of clean, subsurface sources. In response, it is projected that wastewater reuse (gallons/yr) will necessarily double by 2035. Impaired water such as wastewater requires due diligence for removal of disease-causing pathogens; again, due to increased and concentrated anthropogenic contaminants.

Microbiological pathogens, viruses, protozoa bacteria and organic contaminants in particular, are of great concern in municipal and at-the-source water supplies, particularly as these sources become scarcer and more polluted with increasing population coupled with increasing industrialization of developing countries. Filtration (over coagulation for instance) remains a method of choice for water treatment for both municipal plants and at-the-source or home treatment, given the ease of use, rapid treatment rate, and re-usability filter media (thus reduced cost). However, size-exclusion filtration is challenging for small pathogens such as viruses. Therefore, filtration by chemical affinity is an attractive option. Self-cleaning membranes or surfaces are also particularly attractive for water treatment, in that biofouling is a considerable challenge. Furthermore, the ability to clean filtration media extends its use and lifetime.

The primary issues relative to microbiological contaminants are 1) viruses are virtually impossible to filter by size exclusion due to their small diameter, and 2) biofouling of membranes is a ubiquitous problem, regardless of the type of water that is treated. Finally, the public is increasingly wary of using tap water, let alone treated waste-water for domestic use. Incidents such as the 1993 Milwaukee cryptosporidium outbreak have eroded public confidence in municipal water quality. However, confidence would build with development of highly effective, state-of-the-art treatment technologies.

What is needed is a method and system for treating fluid streams that is less expensive and more effective than current methods and systems.

One advantage of the present disclosure is to provide an improved fluid treatment method and system.

Another advantage of the present disclosure is to provide a fluid treatment method and system that effectively removes pathogens and/or organic material from municipal water.

Another advantage of the present disclosure is to incorporate in a membrane a coating for preventing or removing biofouling of the membrane and extending its useful lifetime.

Another advantage of the present disclosure is to provide alternatives to titanium dioxide as photocatalytic materials for coating surfaces.

Another advantage of the present disclosure is to provide a layering method of affixing photocatalytic agents to surfaces, using materials that are resistant to photocatalytic oxidation.

Other features and advantages of the present disclosure will be apparent from the following more detailed description of the preferred embodiment, taken in conjunction with the accompanying drawings which illustrate, by way of example, the principles of the disclosure.

BRIEF DESCRIPTION OF THE DRAWINGS

FIG. 1 is an illustration depicting chemical modification of a membrane surface for pathogen capture via chemical affinity rather than size exclusion according to an embodiment of the present disclosure.

FIG. 2A is an illustration of a mini-column filtration experiment for chemical affinity filtration of MS-2 bacteriophage according to an embodiment of the present disclosure.

FIG. 2B is an illustration of typical MS-2 plaque assay on *E. Coli* according to the present disclosure. Each dark spot represents a pfu (plaque-forming unit).

Wherever possible, the same reference numbers will be used throughout the drawings to represent the same parts.

SUMMARY

Figure 3:
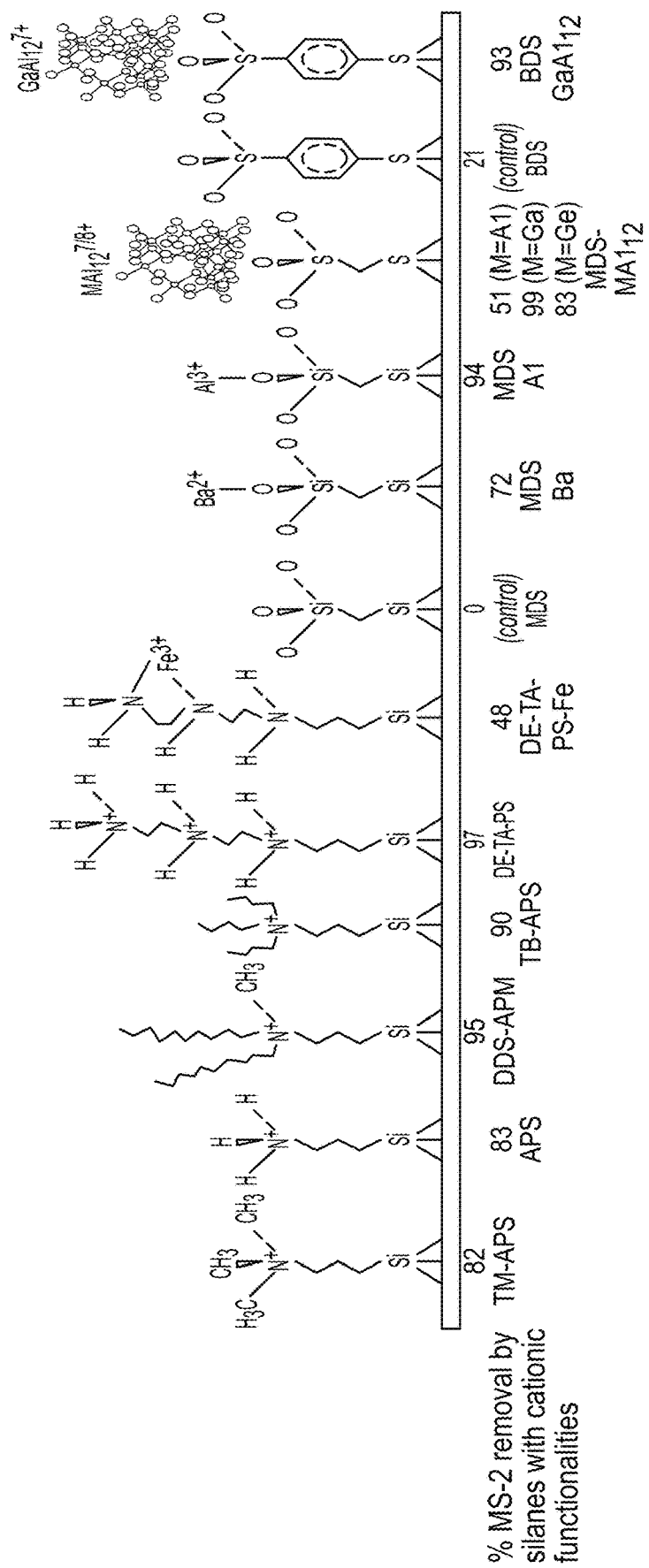
FIG. 3 is a pictorial representation of results of MS-2 filtration via chemically modified surfaces according to an embodiment of the present disclosure.

According to an embodiment of the disclosure, a functionalized component is disclosed that include a substrate having a surface, and a high charge density binding component attached to the surface and capable of binding a microorganism or organic molecule or organic material thereto.

According to another embodiment of the disclosure, a method of capturing a contaminant is disclosed that includes exposing a fluid stream comprising a concentration of a contaminant to a high charge density binding component to reduce the concentration of the contaminant in the fluid stream. The high charge density binding component is attached to a surface of a substrate.

Other features and advantages of the present disclosure will be apparent from the following more detailed description of the preferred embodiment, taken in conjunction with the accompanying drawings which illustrate, by way of example, the principles of the disclosure.

DETAILED DESCRIPTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete and will fully convey the scope of the invention to those skilled in the art.

According to an embodiment, this disclosure is directed to functionalize ideal surfaces with 1) a chemical species that binds microorganisms and/or 2) a photocatalyst that is of ideal geometry (flat) and chemistry (anionic) for compatibility with the binding chemical species. High cationic charge is important for adsorbing the microorganisms by chemical affinity (rather than settling or some other physical mechanism). Hydrophobicity is also potentially important, but it can degrade under UV-irradiation for photocatalysis. In an embodiment, the functionalized surfaces may be applied to functionalizing membranes for water filtration, to improve filtration beyond size exclusion, into the chemical affinity realm. In another embodiment, the titanate layers alone may also be useful for antifouling; which is one of the biggest challenges of water treatment by filtration.

According to another embodiment, the present disclosure is also directed to the filtration of microorganisms and/or organic molecules and compounds by utilizing nano-engineered filtration membranes or filtration media that include a functionalized surface that captures pathogen and/or organic material. In an embodiment, the microorganisms may be pathogens. The nano-engineered filtration membrane or filtration media may also include a catalyst that catalytically destroys the captured pathogen and/or organic material.

Microorganism and/or organic material, which may be referred to as contaminants, capture by chemical affinity rather than size exclusion allows the use of larger-pore membranes, thus mitigating or eliminating problems related to very small pores, which includes high pressure (and energy) requirements to force the water through the membrane, pore clogging, and slow filtration rate. Furthermore, if filtration through a membrane or filter bed removes microorganism and/or organics with greater confidence, chemical treatment such as chlorination may not be required in some cases. Chlorination, though cheap and widely used, has the drawback of introducing soluble chlorocarbons into the water. Microorganism and/or organics destruction that can be manually initiated as by the disclosed invention allows for controlled cleaning to minimize biofouling, increase the lifetime of filtration media, decrease operation costs, increase efficiency of water treatment processes, and gain public confidence. These benefits help ensure a viable future for wastewater treatment technologies, and thus mitigate the worldwide growing water crisis.

The microorganisms may include viruses, biofilm-generating bacteria, protozoa, cysts, ova, fungi and pathogenic bacteria.

The organic material may include, but is not limited to pesticides, solvents, fuels, pharmaceuticals, polysaccharides, and other persistent organic compounds.

According to another embodiment of the present disclosure, a method is disclosed to functionalize a surface for filtration and/or purification of microorganisms and/or organic material. The functionalized surface may be formed on a membrane or filtration media.

Filtration media includes organic materials, such as, but not limited to membranes made of cellulosic and regenerated cellulose materials and/or polymers, such as, but not limited to polyethersulfone, and membranes, such as but not limited to polytetrafluoroethylene and other such products. Filtration media also includes inorganic materials such as, but not limited to glasses fibers, porous glasses, sand, and mineral compositions.

The filtration media may be in the form of a fibrous mass, plate, sintered plate, porous solid and gel material, mesh, lattice, or other physical constructs.

The filtration may be used for liquid and/or gas applications. The liquid application may be, but is not limited to municipal water purification, military applications in the field, water for industrial uses, household supplies, purification onboard ships, space vehicles, and other places where reliability and longevity of purification systems is critical.

The gas application may be, but is not limited to filtration of air for hospitals, submarines, airplanes, space vehicles, clean rooms, and other facilities needing where filtration systems must not be impaired by a buildup of contaminants.

The functionalized surface includes a first component, which may be referred to as the binding component. The binding component has an affinity for microorganism and/or organic material capture as well as serving as the binder for the second optional component, when present.

The binding component may be a compound whose molecules have a high charge density and are themselves resistant to oxidative degradation.

In an embodiment, the binding component may be an inorganic polycation. In an embodiment, the polycations may be polyoxometalate polycations. Polycations offer photodegradation resistance, which is problematic for comparably effective organic functional groups, and high charge density, important for capture of anionic contaminants.

In another embodiment, the binding component may be a silane coupling agent such as diethylene-triamino-propylsilane and numerous others. Silane coupling agents offer opportunities for photodegradation resistance as well as presenting a wide variety of functional groups to effect capture of contaminants.

In an embodiment, the binding component may be a silane with cationic functionalities, meaning that it presents a net positive charge to the surroundings after binding to a substrate such as a filter medium.

In another embodiment, the binding component may be an aminosilane or disilane having metal-based cations and/or polycations anchored thereto.

The binding component adsorbs the target material to the surface by presenting an opposite electrostatic charge. The binding component may also attach a photocatalyst to the surface by hydrophobic interactions, disulfide bonds, or other forms of affinity.

The optional, second component is a photocatalyst. The photocatalyst catalyzes destruction of microorganisms and/or organic compounds and materials. The destruction of microorganisms and/or organic compounds and materials is via controlled, UV-initiated production of reactive oxygen species.

In an embodiment, the photocatalyst may be a delaminated titanate. In an embodiment, the delaminated titanate may be a delaminated cesium or sodium titanate. In another embodiment, the delaminated titanate may be doped and/or treated with agents that may alter the catalytic properties of the titanate.

Agents for doping and/or treating the photocatalyst are numerous and provide possibilities of enhancing their catalytic efficiency, stability, and other desirable properties. Such dopants may include, but are not limited to nitrogen, lithium, niobium, or other elements or molecules.

Delaminated photocatalysts are readily attached to surfaces. In an embodiment, delaminated sodium titanates may be formed by a hydrothermal synthesis process as for example disclosed in U.S. patent application Ser. No. 13/253,964 filed on Oct. 6, 2011, titled "Biomimetic Membranes and Methods of Making Biomimetic Membranes," the content of which is incorporated by reference in its entirety. The combination of an inorganic poly cation and delaminated sodium titanate catalyst on a surface showed synergistic functionality of capturing bacteriophage, followed by photocatalytic destruction.

According to another embodiment of the disclosure, the first component may a binding/catalyst component. According to this embodiment, the binding/catalyst component may be a highly charged or otherwise modified delaminated titanate that has dual functionality, serving as both the capturing component and the photocatalyst component.

In one embodiment, the disclosure may be directed to a binding component applied to a filtration medium. In another aspect of the disclosure, the disclosure may be directed to the binding component in conjunction with the photocatalyst applied to a filtration medium. For example, aluminum polycationic clusters might be bound to a surface to provide only capture functionality, while adding delaminated titanate nanosheets as a second component would add the ability to destroy captured contaminants via photocatalyzed oxidation.

In another embodiment, the disclosure may be directed to a binding component applied to a surface that is not a filtration medium but one intended for capture of contaminants from gas, water or other fluid around it. In yet another embodiment, the disclosure may be directed to the binding component in conjunction with the photocatalyst applied to a surface.

In an embodiment, the surfaces may be transparent and may provide transmission of electromagnetic radiation, including visible and/or UV light to the binding and/or photocatalytic component. In an embodiment, a delaminated titanate may be applied to a light-delivering surface, such as optically conductive fiber, light emitting diode, quantum dots, directly onto phosphors, or the walls of a transparent tube or pipe to create a backlit photocatalytic surface. Photocatalytic activity is thereby sited in locations otherwise difficult to illuminate by ultraviolet or other activating light. In another embodiment, delaminated titanates may be applied to a transparent surface in a fluid stream to reduce contamination by photocatalytic oxidation, or remove biofouling periodically or continuously.

FIG. 1 illustrates a filter 100 according to an embodiment of the disclosure. As can be seen in FIG. 1, the filter includes a filter material 110 having pores 112. The pores 112 have an average inside pore diameter D that provides for size-exclusion filtration through the filter 100. According to an embodiment of the invention, the filter material 110 includes a surface 114 has been treated by the addition of functional groups 116 that have an affinity for select molecules and/or materials. In this embodiment, the functional groups include cationic clusters 116 that have an affinity and capture for a virus 118. In addition, the surface has also been treated with an organic polyion for hydrophobicity. For example, the cationic clusters in this embodiment may be an aluminum or gallium polycationic clusters, for example, but not limited to $[Al_{13}O_4(OH)_{24}(H_2O)_{12}]^{7+}$, $[GaAl_{12}O_4(OH)_{24}(H_2O)_{12}]^{7+}$, and $[GeAl_{12}O_4(OH)_{24}(H_2O)_{12}]^{8+}$. Gallium clusters include $[Ga_{13}(OH)_{24}(H_2O)_{24}]^{15+}$.

Further in example, the organic polyion may be an ionic polyion that serves to both attract the polycationic cluster which attracts anionic contaminants. It also provides hydrophobicity to the surface which also renders it attractive to said contaminants.

Further in example, the organic polyion may be a polymer functionalized with an anion such as a sulfonate, carbonate, and nitrate. For example, the organic polyion may be polystyrene sulfonate.

The functional groups 116, which includes the binder and binder/photocatalytic component, may be may be deposited upon the surface 114 by exposing it to a pure solution of a functional component, which may or may not also require adjustment of solution conditions such as pH, for a predetermined time period. Functional components may be deposited in successive layers of same or alternating components, which may or may not involve adjustment of solution conditions, resulting in a complete coating with the desired properties.

In another embodiment, the functional group(s) may be selected for stability on that surface in aqueous conditions (i.e., does not readily detach).

In another embodiment, the functional group(s) may be selected for stability in a range of common aqueous conditions encountered in potable water including pH (~6-8), ionic strength of the solution or may be selected for optimized functionality under particular aqueous conditions in accordance with chosen applications.

In another embodiment, the functional group(s) may be selected for stability in a fluid containing dissolved ions such as silica, phosphorous, $Ca2^+$, $Mg^{2+}$, $Fe^{3+}$, etc.

In another embodiment, the functional group(s) may be selected for stability against photodegradation that will be performed by the attached photocatalyst designed to destroy the adsorbed microbe.

In an embodiment, cationic functional groups are used in general since most microbes, including viruses, are anionic under typical conditions, resulting in an electrostatic chemical affinity. Both organic and inorganic functional groups may be used. In an embodiment, the organic functional groups may be attached to the surfaces through silane coupling agents, and the inorganic functional groups may b e adsorbed onto the surface simply via electrostatic self-assembly.

Example 1

In an example of the present disclosure, a filtration system was assembled including small columns filled with glass beads that had the bead's surface functionalized by the chemical functional groups. In this configuration, the very large pores between the beads perform limited size exclusion filtration. The functionalized surface performs affinity or capture filtration. In this example, a 27 nm diameter bacteriophage, MS-2, which is a non-enveloped, chemically-resistant, waterborne RNA virus was used as a model contaminant due to its small size, ease of use in BSL-1 laboratory, and physical similarity to poliovirus, a notable waterborne pathogen, and ordinarily impractical to remove by filtration.

Filtration of MS2 bacteriophage using chemically modified surfaces was carried out in Pierce Spin Columns, which are autoclavable and have a bed volume of 2 mL (total capacity of 5 mL, catalog # P189896). These are dimensioned to sit inside standard centrifuge tubes, allowing loading and elution without pumps or tubing, using either gravity or centrifugation. The filtration medium and support for chemically-functionalized coatings was comprised of 0.5 mm diameter glass beads (Biospec). Before any coating procedure, the beads were cleaned with piranha, a 1:3 mixture of 30% hydrogen peroxide and concentrated sulfuric acid, for 4 hours, rinsed with deionized water, absolute methanol, deionized water, and dried at 100° C. under vacuum.

All silane coupling agents were purchased from Gelest, Inc, and these were used as received. Coating the beads with silane coupling agents was found to be most effective in a fresh mixture of absolute methanol, agent, and deionized water in volumetric proportions of 90:4:6, added in that order. Beads were exposed to the coating solution for 1-2 hours with continuous stirring, and then placed on filter paper in a Buchner funnel for vacuum-assisted draining and cleaning. The beads were rinsed twice with absolute methanol and at least 10 volumes of deionized water (using water first proved to be detrimental). The coated and cleaned beads were then annealed for an hour at 90-100° C., and were stored in a sealed glass container if not used right away. Secondary coatings, if applied (usually addition of a cationic metal ($Al^{3+}$, $Ba^{2+}$), were generally using aqueous solutions for one to two hours with stirring. Silane coupling agents (and their abbreviations) that were utilized include 1) amino-propylsilane (APS), 2) trimethyl-aminopropylsilane (TM- APS), 3) didecylmethl-aminopropylsilane (DDM-APS), 4) tributyl-aminopropylsilane (TB-APS), 5) diethylene-tri-aminopropylsilane (DE-TA-PS), 6) methyldisilane (MDS), and 7) benzyldisilane (BDS).

Aluminum polycations, $[(GeO_4)Al_{12}(OH)_{24}(H_2O)_{12}]^{8+}$ $[(AlO_4)Al_{12}(OH)_{24}(H_2O)_{12}]^{7+}$ and $[(GaO_4)Al_{12}(OH)_{24}(H_2O)_{12}]^{7+}$ (referred collectively as $MAl_{12}^{7/8+}$; M=Ge, Al, Ga) were synthesized. The solution was adjusted to about one pH point above their natural pH for a final pH of between 5 and 6, and the aluminum concentration was 900-1000 ppm, as determined by ICP-MS. Beads were first coated with methyldisilane, then rinsed with deionized water and dried before use, but not annealed again. Analogous coating chemistries to glass slides, so that the coating could be characterized by UV-vis spectroscopy.

Dried, coated or control beads were loaded into the mini-columns at 2.5 grams each on the day of use. Air was displaced from the bed by adding deionized water, capping, inverting several times, and then allowing beads to settle under an excess of water. The beds were gravity-drained, then capped until needed. MS-2 containing solutions ($10^5$ pfu/ml concentration; pfu=plaque-forming unit) were added at 0.75 mL per column, a volume equal to the void volume of the settled bead bed, and allowed to reach equilibrium. One minute was allowed for binding, then elution was begun by first adding 0.25 mL of water, allowing it to sink in as eluate was captured in a centrifuge tube, followed by four more discrete additions of one in as eluate was captured in a centrifuge tube, followed by four more discrete additions of one milliliter apiece as the eluate pool was collected. This solution was then plaque-assayed (see below) for MS-2 population, post column filtration experiment.

FIG. 2A shows an illustration of this setup and procedure of Example 1, including a coated bead column 200, an inlet 210 for receiving the contaminated water, filtered water 220, and a collection plate 230.

FIG. 2B shows a typical MS-2 plaque assay 260 of the pre-filtered water.

*Escherichia coli* strain C3000, the required host organism for the MS2 model virus, was obtained from American Type Culture Collection (ATCC) and maintained in continuous cultivation at 36±1° C. either in tryptic soy broth or on tryptic soy agar (TSA, 1.4% agar).

The MS2 bacteriophage used in viral clearance experiments was ATCC strain 15597-B1O, reconstituted from the freeze-dried state according to ATCC instructions and expanded into an early log-phase *E. coli* culture in order to produce a high-titer seed stock for routine use. Numbers of individual MS2 were visualized as plaque forming units (pfu) by dilution with sterile Dulbecco's phosphate buffered saline (DPBS) to a point where each live virus, when inoculated onto an agar plate of *E. coli*, would create a clarified zone (plaque) of infected and lysed bacteria.

For quantification, plaque assays were performed as described in the USEPA Manual of Methods for Virology. Briefly, test samples were diluted in sterile DBSS, with a target of 100-300 pfu mL$^{-1}$, and combined with *E. coli* host cells in soft TSA (0.7% agar) at 44±1° C. The molten mixture was spread onto a solid feeder layer of TSA in a 100 mm petri dish and allowed to gel. Plaques were counted after 14 to 16 hours of incubation. For virus removal experiments, the target MS2 load was typically $10^5$ pfu per mini-column.

FIG. 3 illustrates a pictorial summary of an embodiment of surface chemistries and pathogen-binding affinities according to the disclosure.

As can be seen in FIG. 3, triply-charged diethylene-triamino-propylsilane (DE-TA-PS) is the most effective binding agent, mostly likely due to its higher molecular charge. The three other amine-functionalized silanes vary in hydrophobicity with DDM-APS>TB-APS>TM-APS>APS. The MS2 removal efficacy matches this trend, indicating that hydrophobicity is a surface characteristic that also increase virus affinity.

Furthermore, comparing the anionic controls, BDS (benzyldisilane) and MDS (methyldisilane) reveals the BDS actually has some binding affinity for MS-2, despite the fact that it carries a negative charge, while MDS captures negligible MS-2.

In addition, as DE-TA-PS also binds metal; the surface coating was modified with addition of $Fe^{3+}$. While it was observed that this did not increase the affinity for MS-2, it may for other microbes that utilize iron in metabolic processes. The MDS and BDS provided a second silane functionality for coupling to metal cations or polycations such as divalent $Ba^{2+}$, trivalent $Al^{3+}$ and polycationic $[MAl_{12}O_4(OH)_{12}(H_2O)_{24}]^{7+}$ (M=Al, Ga).

The anionic disilanes alone have minimal affinity for binding MS-2. However, the addition of the metal cation or polycationic clusters produced various coatings with affinity for MS-2. For example, MDS-GaAl$_{12}$ is particularly effective in experiments measuring clearance of this virus from water. The BDS also provides a functional group that adsorbs in the UV-vis spectrum for characterization purposes.

In summary, both cationic charge and hydrophobicity exhibit good surface characteristics for capturing anionic microbial contaminants such as MS-2.

In another embodiment, aluminum polycations were used as the functional groups in experiments in solution as well as bound to surfaces, such as mica. Among aluminum polycations, GaAl$_{12}$ increased removal of MS-2 compared to AlAl$_{12}$ (Al$_{13}$), which may be attributed to the poorer stability of Al$_{13}$. Thus these studies proceeded with GaAl$_{12}$ in particular.

A challenge in developing nanoscale coatings on surfaces is finding direct methods of demonstrating and characterizing successful application of functional materials, since they generally cannot observe directly. Indirectly, an expected trend in MS-2 adsorption may be observed, but a direct characterization method is also desired. UV-vis spectroscopy may be if the functional group is photoactive. In this regard, two routes for characterizing chemically modified surfaces by UV-vis spectroscopy have been applied, both utilizing multi-layer coatings. In both examples, the GaAl$_{12}^{7+}$ polycation is alternatively layered with an anionic photoactive specie, and multi-layered growth was monitored after each coating was applied. In one case, the photoactive specie may be an anionic cluster of approximately the same size and shape as the aluminum polycation; phosphotungstate $[PW_{12}O_{40}]^{3-}$. The second is a polymer, for example polystyrene sulfonate.

Figure 4:
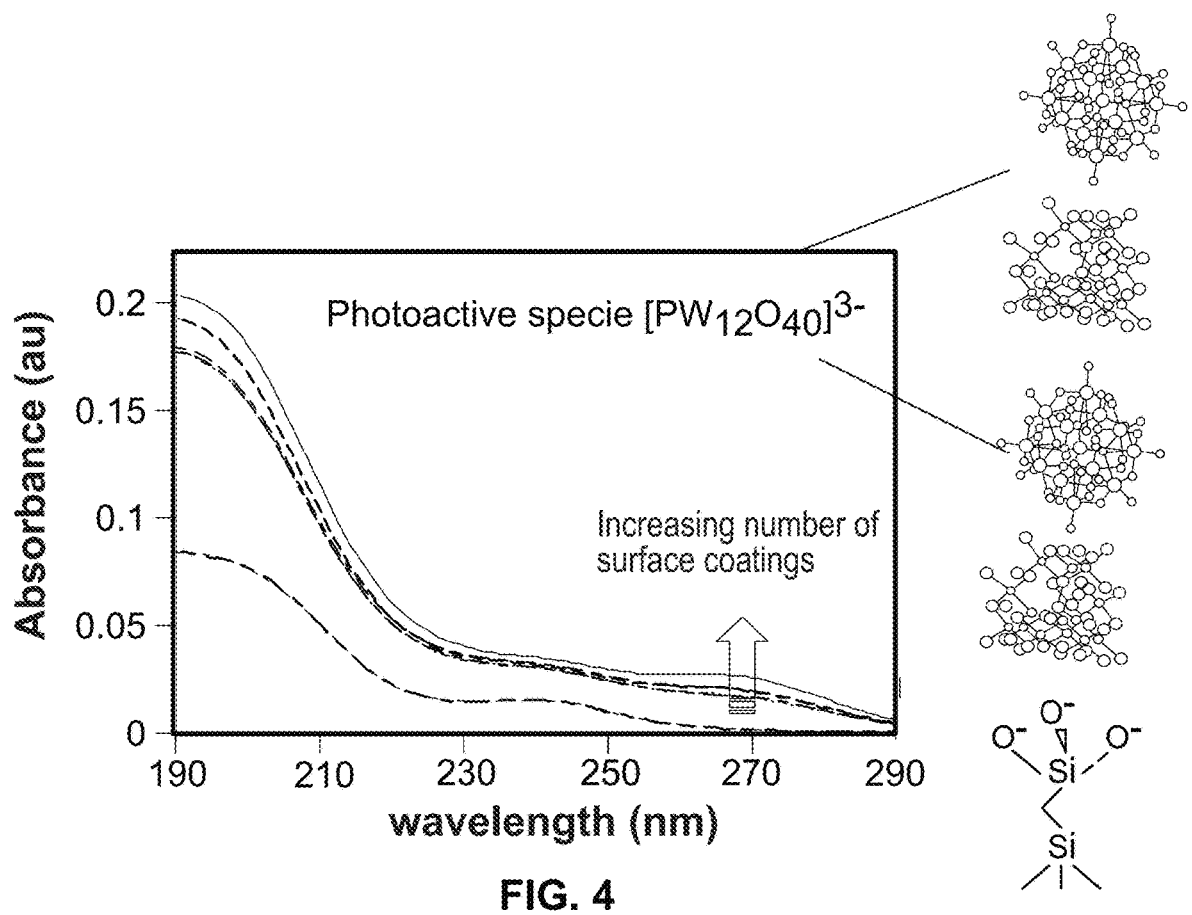
FIG. 4 is a UV-vis spectra of multi-layer coating of $GaAl_{12}$ polycation interlayered with photoactive species according to an embodiment of the invention. The spectra demonstrate a direct method of characterization of layer-by-layer surface coatings.
Figure 5:
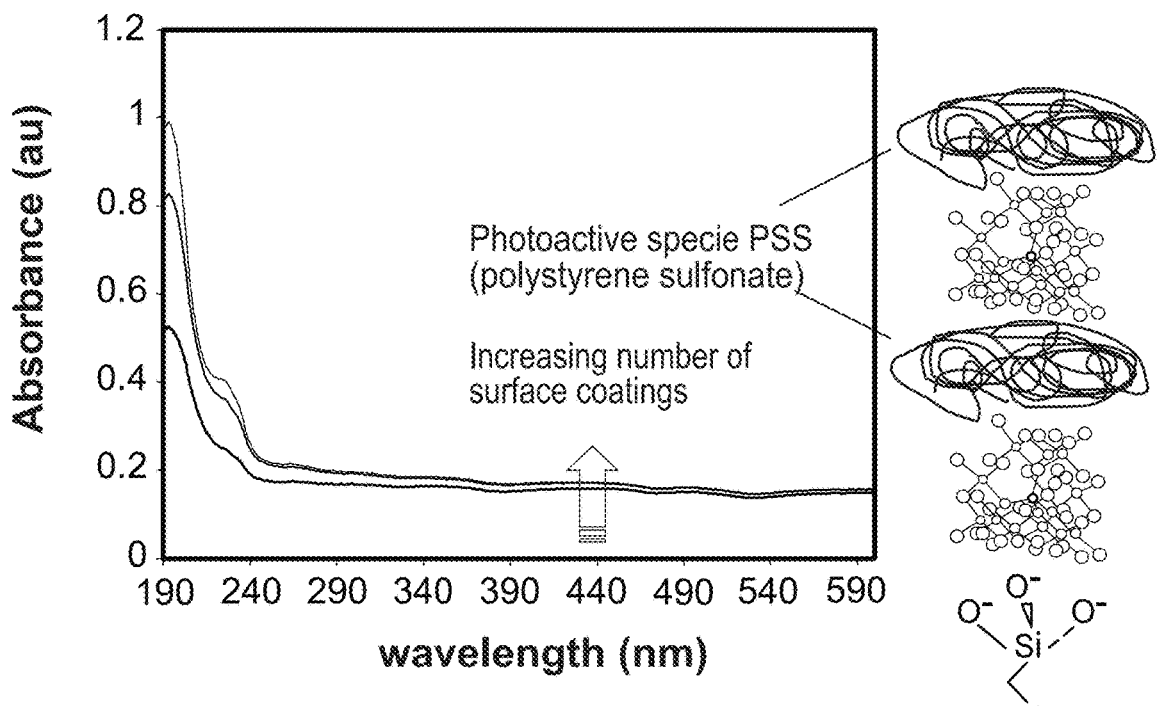
FIG. 5 is a UV-vis spectra of multi-layer coating of $GaAl_{12}$ polycation interlayered with photoactive species according to another embodiment of the invention. The spectra demonstrate a direct method of characterization of layer-by-layer surface coatings.
Figure 6:
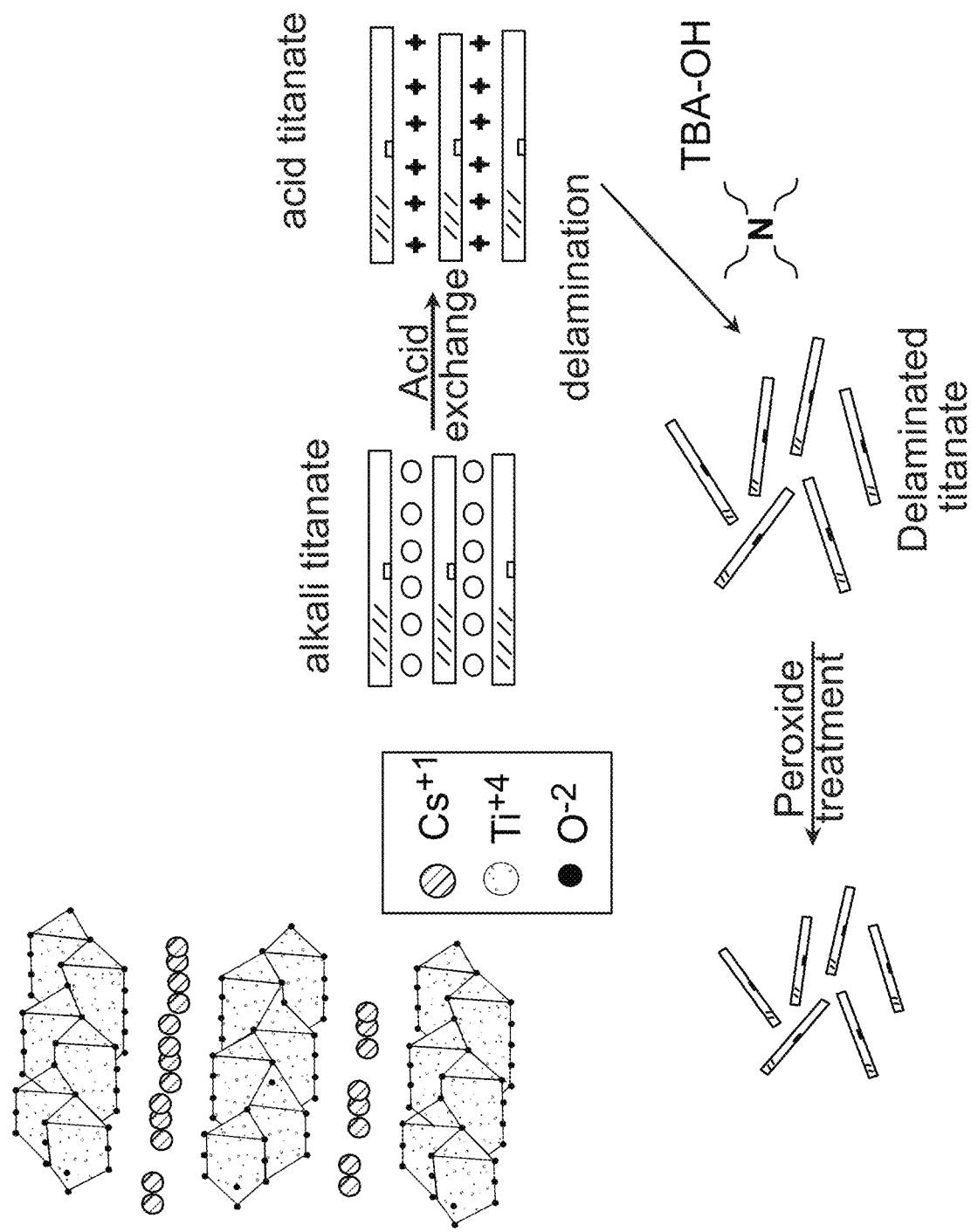
FIG. 6 is a schematic of the steps of titanate photocatalyst formation according to an embodiment of the invention. Forward hatched layers are anionic titanate layers. Rearward hatched layers are peroxide treated titanate layers. Spheres are alkali cations (Na+ or Cs+), '+' signs are H+ cations. TBA-OH is tetramethylammonium cations [(CH$_3$)$_4$N+].

FIGS. 4 and 5 illustrate multi-layer coatings of alternating anions and cations, along with the UV-vis spectra. In these examples, phosphotungstate and polystyrene sulfonate serve as surrogates for delaminated titanate photocatalysts, indicating success of the same binding mechanisms used to apply the titanates to surfaces.

According to an embodiment of the invention, the photocatalysts of the present disclosure possesses one or more of the following criteria: 1) geometry conducive to surface coating; 2) chemistry conducive to surface attachment; 3) potent photocatalytic activity; 4) compatibility with functionalities that adhere microbiological contaminants; and 5) economy and simplicity.

In an embodiment, the photocatalyst may be a layered titanate applied with or without the use of an intermediate binding layer, depending on the charge of the surface. In an embodiment, the titanate may be a delaminated (exfoliated) titanate, for example Cs-titanate and Na-titanate.

In an embodiment, a Cs-titanate parent material may be synthesized by solid-state reactions and is a non-hydrous phase.

In another embodiment, a layered sodium titanate material is formed hydrothermally. This form of layered sodium titanate may be referred to as sodium nonatitanate (SNT), which is the subject of U.S. patent application Ser. No. 13/253,964 filed Oct. 6, 2011, titled "Biomimetic Membranes and Methods of Making Biomimetic Membranes," which is hereby incorporated by reference in its entirety.

The general formula for SNT is $Na_4Ti_9O_{20} \cdot xH_2O$, (x between 0.5 and 2). Although the Cs:Ti ratio varies slightly for the Cs-titanate material, depending on the synthesis, an average formula is $Cs_{0.36}Ti_{0.91}O_2$. Both structures have approximately double-layers of edge-sharing $TiO_6$ octahedra; the Cs-titanate has approximately 90% occupancy in the double-layers. A major difference between the Cs-titanate and SNT is interlayer water that hydrates $Na^+$ in SNT, whereas the Cs-titanate contains no water. Peroxide-modified, delaminated titanate sheets, where peroxide ligands replace some oxo and hydroxyl ligands, as indicated by the yellow color of these materials, were also prepared. Peroxide modification may increases activity of $TiO_2$ photocatalysis, such as by repressing electron-hole recombination. Peroxide ligation of titanate materials can also increase surface area as shown in ion sorption studies, thereby also potentially providing enhancement for heterogeneous catalytic activity.

Example 2

Methyl-orange and bromophenol blue photo-decomposition by four derivatives of delaminated titanates were compared to each other, as well as to Degussa P25 $TiO_2$. The four titanate catalysts are: 1) NaTi, 2) peroxide-NaTi, 3) CsTi and 4) peroxide-CsTi, which denote the parent material and peroxide ligation (or not).

For synthesis of the Cs-titanate, ion-exchange and delamination of the titanate materials, a Turbula® System Schatz WAB (Basel, Switzerland) was used for high-speed mechanical shaking. Powders were placed in a 60 mL plastic tube with approximately 30 YSZ milling beads and 20-30 mL alcohol (i.e. methanol, isopropanol). The tube was capped tightly and sealed with electrical tape and mixed for 20-60 minutes. At various stages of their preparation, titanate materials were characterized by powder X-ray diffraction (XRD), thermogravimetry (TGA), infrared spectroscopy (IR).

Powder X-ray diffraction was carried out on a Bruker D8 Advance diffractometer in Bragg-Brentano geometry with Cu-Kα radiation and a diffracted-beam graphite monochromator. Infrared spectra, FTIR, (400-4000 $cm^{-1}$) were recorded on a Thermo Nicolet 380 FT-ID equipped with a Smart Orbit (Diamond) ATR accessory. Thermal analysis was executed with a TA Instruments SDT 2960 for simultaneous thermogravimetric and differential thermal analysis (TGA-DTA) under air flow with a heating rate of 10° C./min. High resolution transmission electron microscopy (HR-TEM) was utilized to characterize the size of the Degussa P2 $TiO_2$ that provided a stable colloid suspension by processing in the Turbula (see below). HRTEM was done on a JEOL 2010 F with Gatan energy filtered imaging, in the High Resolution Microscope User Facility at UNM in Earth and Planetary Science Department.

A layered Cs-titanate was formed using a 1:2.65 ratio of Cs:Ti. $TiO_2$ (10 g, 0.125 mol) and $Cs_2CO_3$ (7.7 g, 0.047 mol Cs) were mixed as an alcohol slurry using the Turbula®. The alcohol was removed in vacuo with heating (40° C.) in a crucible, and the crucible with finely mixed, dry precursor powder was placed in an 800° C. oven overnight. Using the resulting powder, the mixing, drying and heating was repeated one time to obtain the pure desired phase (confirmed by XRD).

SNT was synthesized hydrothermally according to the following steps. Sodium hydroxide (NaOH; 10 g, 0.25 moles) was dissolve in 48 mL DI water in a 125-mL Teflon liner for a Parr reactor. Titanium (IV) isopropoxide (9.6 g, 0.033 moles) was added while stirring vigorously. A white slurry was formed. The reactor was closed and placed in a 170° C. oven for five days. Approximately 4 g of SNT was collected by pressure filtration as a white powder product.

Proton exchange for Cs or Na was carried out with 1 molar $HNO_3$ solution, again utilizing the Turbula®. Several grams of alkali titanate were combined with 75 mL nitric acid in a Teflon bottle for this process. In these exchange conditions, neither layered phase is observed to undergo any dissolution. The $H^+$-exchanged powder was collected by centrifugation and washing; first with water then alcohol. Completeness of exchanged was checked by either energy dispersive spectroscopy (for Na or Cs), or thermogravimetry to 900° C., followed by X-ray diffraction of the heat-treated powder. If Na or Cs remained, sodium titanate or cesium titanate phases would be observed in the diffraction pattern. If the Na or Cs was or cesium titanate phases would be observed in the diffraction pattern. If the Na or Cs was completely removed, only $TiO_2$ was observed. The Cs-titanate required three acid-exchange steps, whereas the acid-exchange of SNT was completed in a single step.

The layered titanates were delaminated by using a 40 wt % tetrabutylammonium hydroxide (TBA) aqueous solution diluted by approximately 50% water; and the $H^+$-titanate powders are combined with the solution for Turbula® treatment for approximately 40 minutes. Again, the solid was isolated by centrifugation, washing and finally drying in a vacuum oven at 70 to 90° C. Both materials only required one step for complete exchange.

Peroxide treatment of the delaminated titanates were treated with peroxide by grinding the dried titanates to a fine powder with mortar and pestle, and suspended in 100% isopropanol at 0.5 wt. %. Hydrogen peroxide, 30% solution, was added dropwise with rapid stirring to a total of 2% of total volume, and allowed to react with continued stirring for 15 minutes. The yellowish peroxotitanates were separated from the mixture by repeated centrifugation and washing with isopropanol, and finally dried in vacuo at 70 to 90° C.

UV-vis spectroscopy was performed in either scanning (for characterization of titanate colloidal suspensions at concentrations of 20 μg/ml) or photometric mode (for quantifying dye concentrations) using a Shimadzu UV-3600 spectrophotometer and 1 cm quartz cuvettes.

Photocatalysis Experiments were performed using a germicidal lamp (GE model G15T8) as a photon source with a radiant energy peak at 254 nm and overall irradiance rated as 49 $mW/cm^2$ at 2 cm distance. The target solutions were held at 18 or 26 cm from the source in multiple 5-mL volumes, contained in 6-well, polystyrene plates. In this way, up to twelve test articles could be exposed at once.

For most experiments, titanates were delivered in small volumes as colloidal suspensions created by shaking powdered preparations in deionized water with the Turbula® and YSZ beads, followed by centrifugation to remove all larger particles prone to settling. A colloidal suspension of Degussa P25™ TiO$_2$ (Aldrich) was prepared in the same way as were those of the delaminated titanates. A sample of each suspension was thoroughly dried and its residue weighed to calibrate concentrations.

Photocatalytic activity at low pH was investigated using methyl orange (MeO), typically at 0.5 or $1.0 \times 10^{-5}$ molar concentration in pH 4.7 to 5.0, 0.01 M potassium phosphate buffer. Photocatalytic degradation of bromophenol blue (BrB) at $10^{-5}$ M concentration was usually carried out at pH 8.0±0.1 in 5 mM sodium borate buffer, although other buffers and concentrations were used at times. Final molar concentrations of the dyes were calculated from readings of absorption at either 480 nm or 590 nm for MO and BrB, respectively, using standard curves.

Figure 7A:
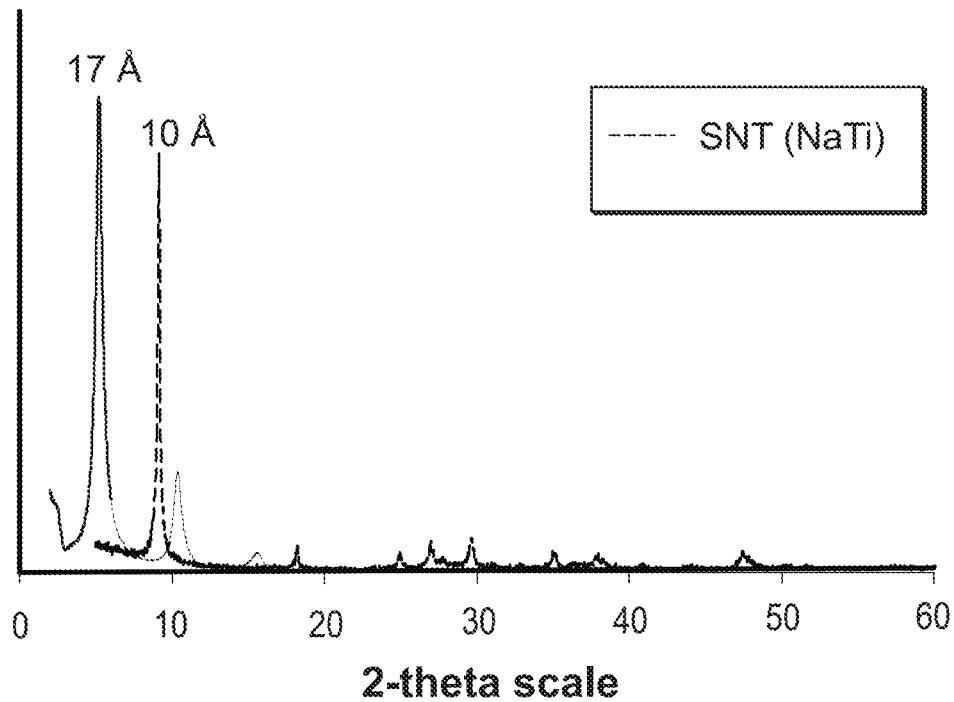
FIG. 7A is powder X-ray diffraction of NaTi (SNT) and NaTi delaminated with TBA-OH (tetrabutylammonium hydroxide) according to the present disclosure.
Figure 7B:
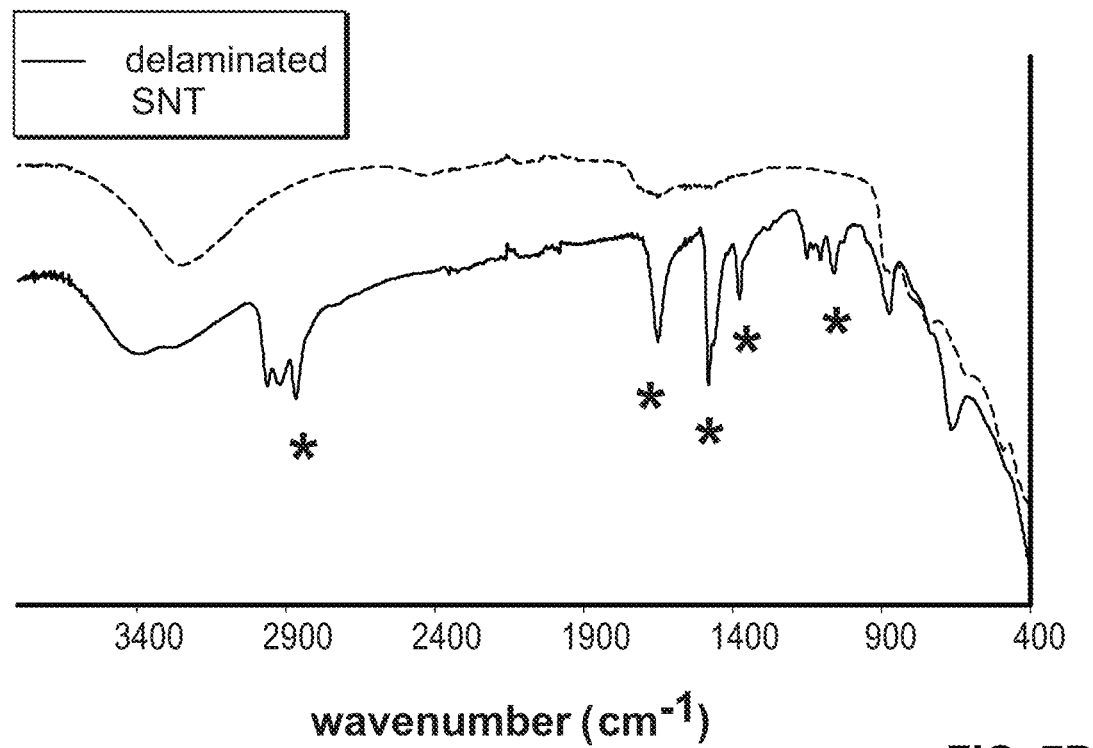
FIG. 7B is an infrared spectra of NaTi (SNT) and NaTi delaminated with TBA-OH (tetrabutylammonium hydroxide) according to the present disclosure. Stars for the infrared spectrum of delaminated NaTi denote the TBA cation.

Powder X-ray diffraction and infrared spectra of the delaminated titanates, NaTi and CsTi, from the SNT and Cs-titanate respectively, looked very similar to both each other. FIG. 7A shows X-ray diffraction spectra of original SNT and the TBA-delaminated SNT. Both are layered materials delaminated with TBA-OH. The SNT has a d-spacing of approximately 10 Å, while the TBA-delaminated has a layer-spacing of 17 Å. FIG. 7B compares infrared spectra of both materials, clearly showing the vibrations of the TBA-cation for the delaminated SNT. Stars on FIG. 7B indicate the infrared spectrum denote the TBA cation. The two peroxide-modified materials do not have significant differences by any of these characterization methods.

Figure 8A:
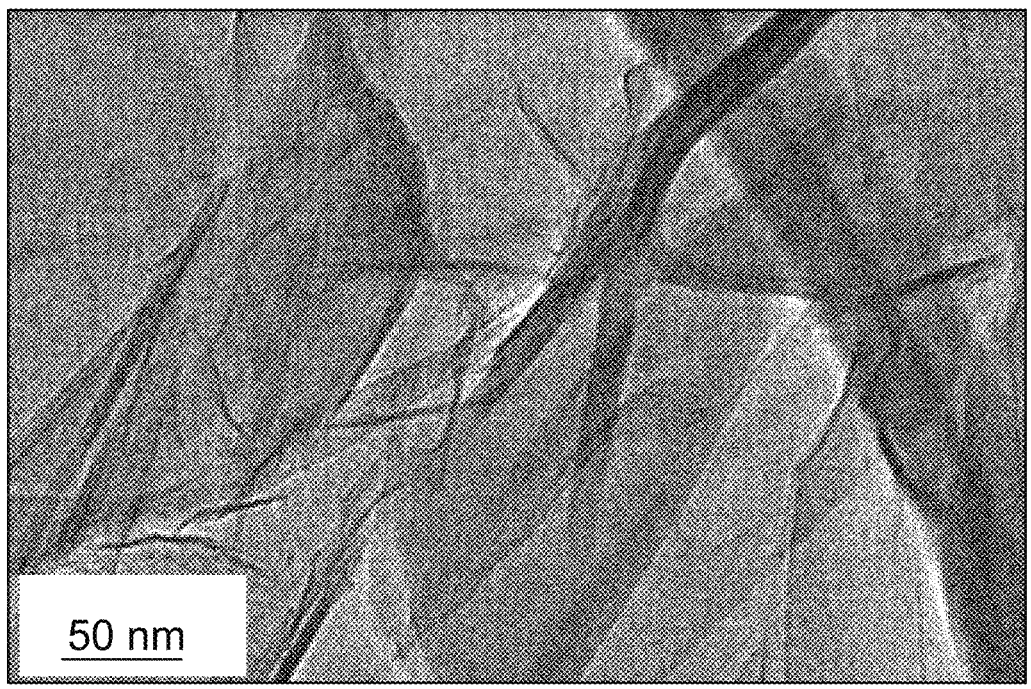
FIG. 8A is a TEM image of typical delaminated titanate according to an embodiment of the present disclosure.
Figure 8B:
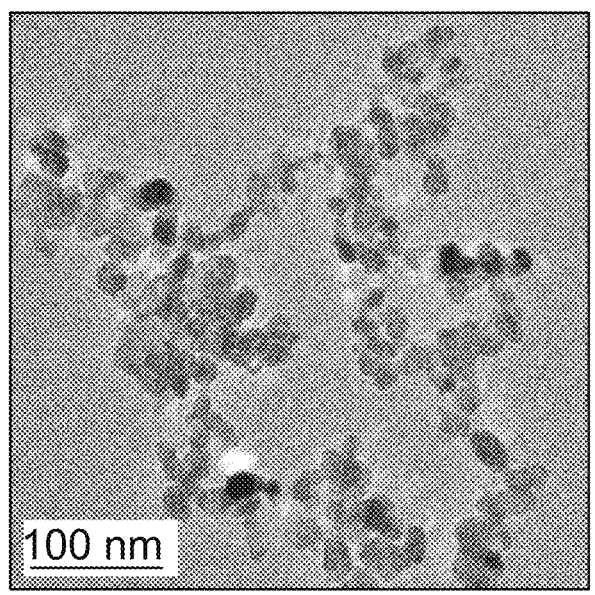
FIG. 8B is a TEM image of colloidal Degussa P25 TiO$_2$ obtained from Turbula processing according to the present disclosure.

FIG. 8A shows TEM images of a typical delaminated titanate material. FIG. 8B shows the colloidal TiO$_2$ obtained by Turbula®-treatment. Both are sufficiently small size and high surface area to provide a stable colloid. By TEM, differences between the SNT derived materials and Cs-titanate derived materials are subtle. The SNT-derived materials are 'wispier'. More significant differences are observable via AFM, and this is discussed later. The colloidal TiO$_2$ obtained via Turbula processing of Degussa P25 TiO$_2$ is 20-80 nm diameter.

NaTi and CsTi derived materials were very similar in their photocatalytic characteristics. However, the distinct advantage of the NaTi is the easier preparation. While CsTi involves two mixing and heating steps for the initial synthesis, the NaTi is just one simple step. More importantly, the exchange of H$^+$ for the alkali, which is imperative for subsequent delamination with TBA-OH, occurs much more readily for NaTi. Complete proton exchange of CsTi was originally reported to require 3×24 hr exchange steps. With use of the Turbula®, we were able to completely the exchange in 2 hr exchange steps; yet three separate steps of providing fresh 1M acid solution was still necessary. On the other hand, H$^+$ exchange of NaTi was complete in a single 2 hr contact time with 1M acid solution. This is a distinct advantage for both research and industrial applications. The obvious difference is the Cs in CsTi is not hydrated, whereas the Na in NaTi is hydrated in the parent material; and thus the hydrated ion is more readily mobilized in the aqueous environment.

Testing of the photocatalytic capacities of the delaminated titanates was initiated in the methyl orange, pH 4.7 to 5.0 system, using stable colloidal suspensions without the need of stirring over the 60 or 90-minute duration of UV exposures. The use of multi-well plates allowed the controlled comparison of several materials in a single session or the periodic withdrawal of samples from replicate wells without disturbance to the remainder. The ultraviolet light field previously was found to be suitably uniform using two mapping experiments that distributed 5-mL portions of a uniform titanate/MO mixture into 12 wells. Readings at 590 nm after 90 minutes exposure resulted in an average MO depletion of $2.82 \times 10^{-5}$ mol/L/hr, with a standard deviation of 0.036, or relative standard deviation of only 1.3%.

Figure 9:
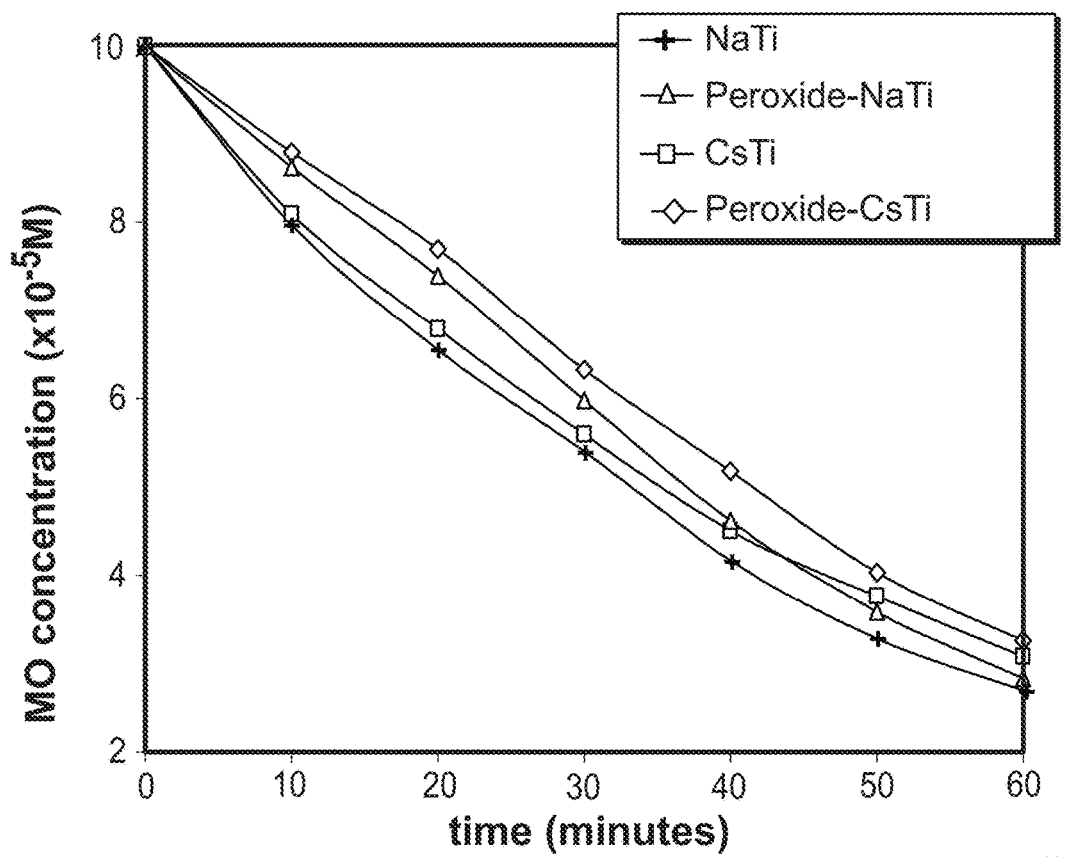
FIG. 9 shows the photocatalytic oxidation of methyl orange by delaminated titanates with catalyst concentration of 50 µg/ml according to an embodiment of the disclosure.

At a concentration of 50 µg/mL in MO, photocatalytic oxidation rates of Cs-titanate and SNT-derived candidates, whether peroxide-treated or not, were close to one another (see FIG. 9), with all achieving the decomposition of at least $6.7 \times 10^{-5}$ mol/L (67%) in one hour. Consistent functional differences between the four materials were resolved only upon moderating conditions to make the test system more sensitive: energy input was reduced by moving the plates from 18 cm to 26 cm from the UV source; the starting dye concentration was reduced from $1.0 \times 10^{-4}$ M to $5.0 \times 10^{-5}$ M; and testing was done to determine optimal concentrations of the titanate nanosheets and a Degussa P25 TiO$_2$ control. The original 50 µg mL$^{-1}$ proved to be too high, presumably because the blockage of light penetration into the liquid overcomes the advantage of increased catalytic surface area as the titanate concentration increases.

Figure 10:
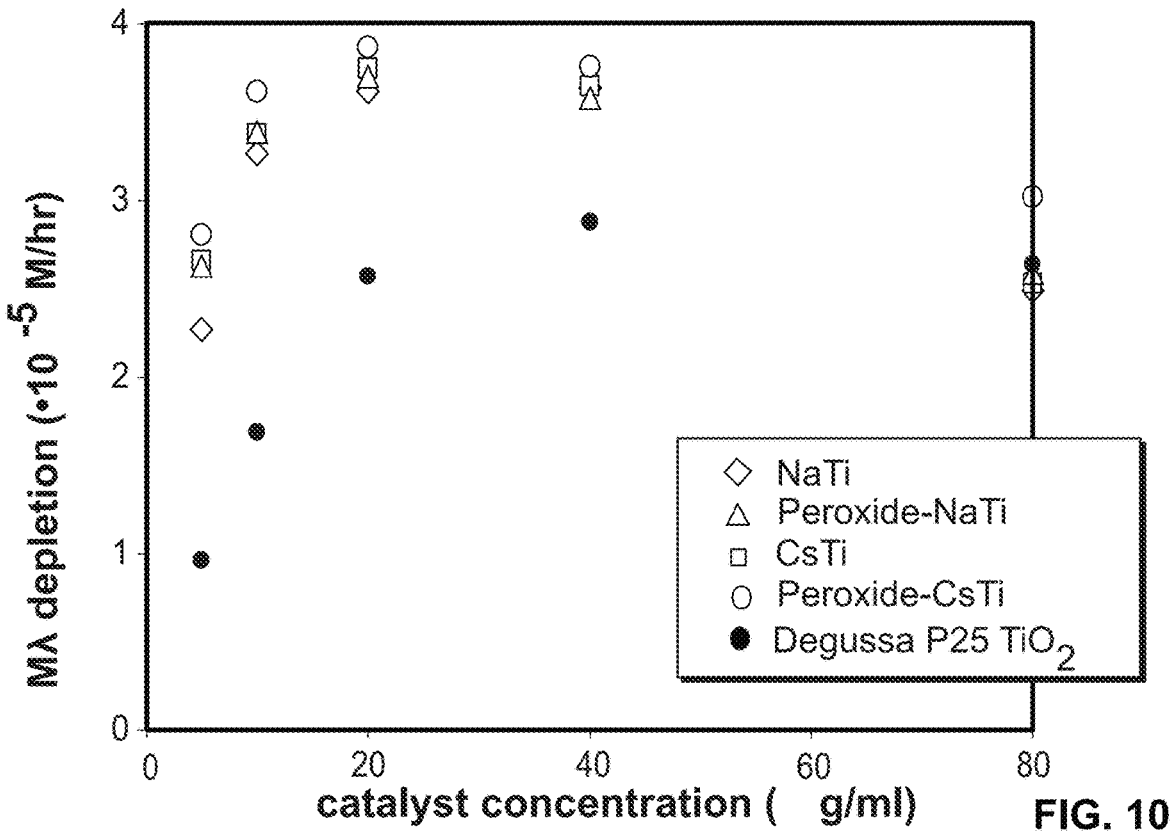
FIG. 10 shows photocatalytic degradation of methyl orange by delaminated titanates and Degussa P25™ TiO$_2$ as a function of catalyst concentration according to an embodiment of the disclosure.

FIG. 10 shows that the titanate nanosheets all achieved optimum efficacy at approximately 20 µg mL$^{-1}$ while P25 performed best at 40 µg/ml but was less sensitive to concentration changes. Differences between their activity rates from one concentration to the next were significant, except between 20 and 40 µg/ml, as were the activity differences for TiO2, except between 60 and 80 µg/ml.

Figure 11A:
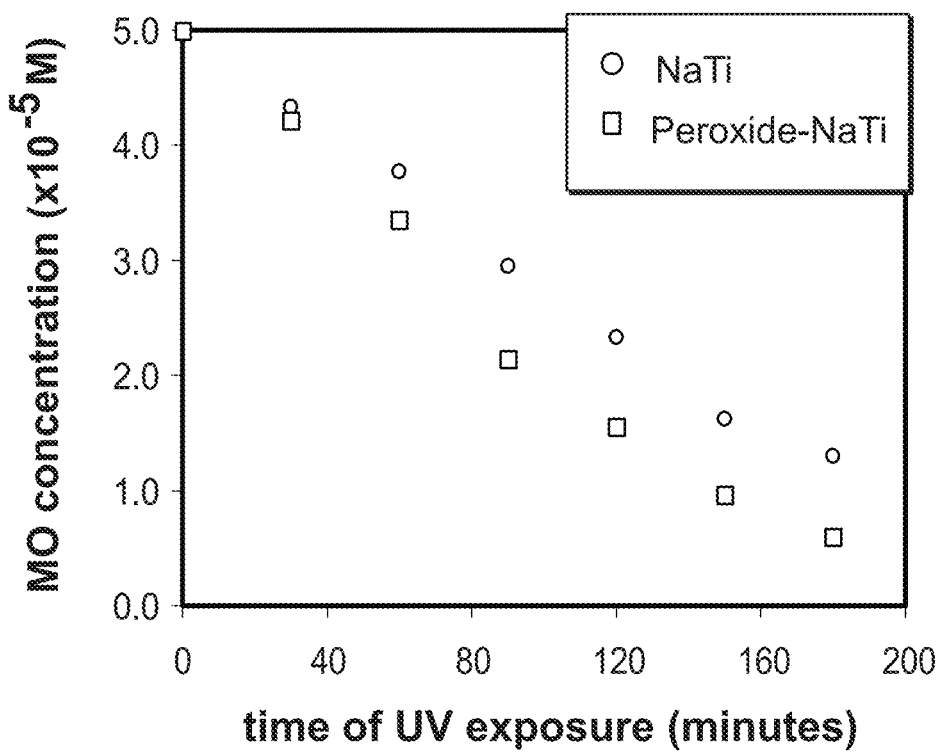
FIG. 11A compares the performance of Na delaminated titanates, with and without peroxide treatment according to an embodiment of the disclosure.
Figure 11B:
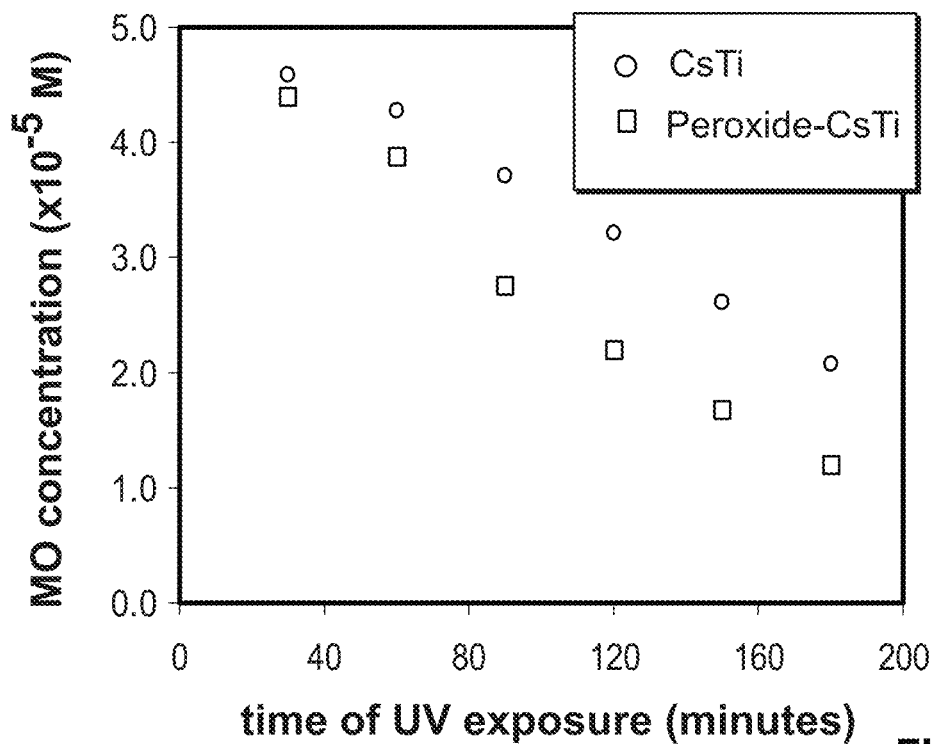
FIG. 11B compares the performance of Cs delaminated titanates, with and without peroxide treatment according to an embodiment of the disclosure.

Performance differences between the titanates became apparent when they were used at suboptimal concentrations. Peroxide-treated versions of both SNT and Cs-titanate-derived catalysts routinely exhibited a modest advantage (2-19% oxidation rate improvement), as exemplified in FIGS. 11A and B. In FIGS. 11A and 11B, titanate catalyst concentration is 5 µg/ml. Resulting concentration ranges for MO were $\leq 0.2 \times 10^{-5}$ M at each point (N=3), and P<0.05 after 60 minutes for peroxide-nonperoxide comparisons in both the NaTi- and CsTi-derived materials. Small variations in the relative performance difference were chiefly due to aging of the suspensions, as the peroxide-treated materials tended to form microaggregates over a period of several weeks at a faster rate than their untreated counterparts.

There was no consistent difference in the photocatalytic efficiency of the SNT versus the Cs-titanate-derived delaminated catalysts. However, as discussed above, the distinct advantage of the SNT is derived from the ease of preparation.

Methyl orange provides a convenient testing system, but is limited to a narrow range of acidic pH in which its color is stable. If the usefulness of photocatalysts is to include oxidative destruction of environmental contaminants, they must be efficacious at a higher pH, generally 7-9. Another organic dye, bromophenol blue (BrB) was selected because its absorbance spectrum is essentially stable between pH 6 and 9, a range conforming to most natural water sources.

Figure 12:
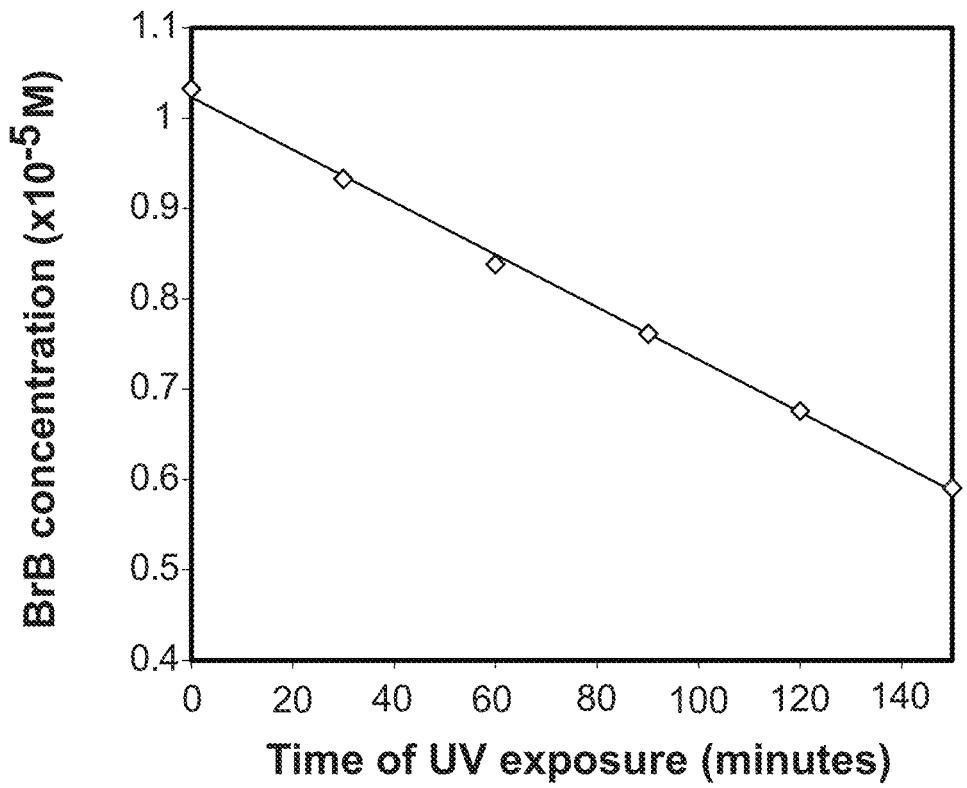
FIG. 12 shows the natural photodegradation of bromophenol blue without a catalyst over time at 26 cm from the UV light source.

FIG. 12 shows the linear rate of photodegradation or BrB when exposed to UV light in the absence of any catalyst. And so, a UV-exposed standard BrB without titanates was used as an indicator of total irradiation from one experiment to the next. For all data from the BrB testing system, the amount of uncatalyzed photodegradation (UPD) measured in each experiment was subtracted as appropriate to calculate the net effect of the photocatalysts.

Figure 13:
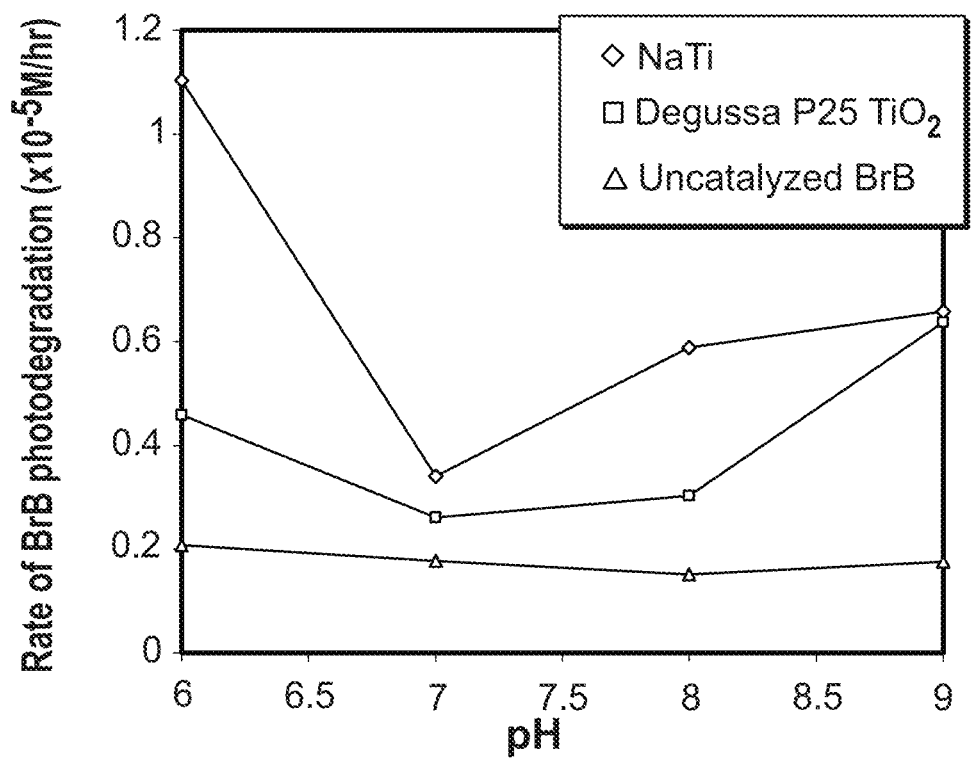
FIG. 13 shows the effect of pH in 5 mM Na borate on one-hour photo-catalytic degradation of bromophenol blue by SNT-derived delaminated titanate compared with TiO$_2$ and uncatalyzed photodegradation under UV. (Triplicate values varied within ±0.014×10$^{-5}$ M/hr from mean at each point.)

FIG. 13 shows the significant effect of pH change for the photocatalysis of BrB in the pH range from 6.0 to 9.0 (in 5 mM sodium borate). Photocatalysis was surveyed using delaminated NaTi and Degussa P25™ TiO$_2$ in one unit intervals. Both catalysts demonstrated the least activity at neutrality and had improved rates at both higher and lower pH. The changes in the rate of catalysis shown here were not associated with flocculation, which has been observed to be a limiting factor in more concentrated, alkaline buffers. The natural UPD rate did not change significantly in connection with pH.

Figure 14:
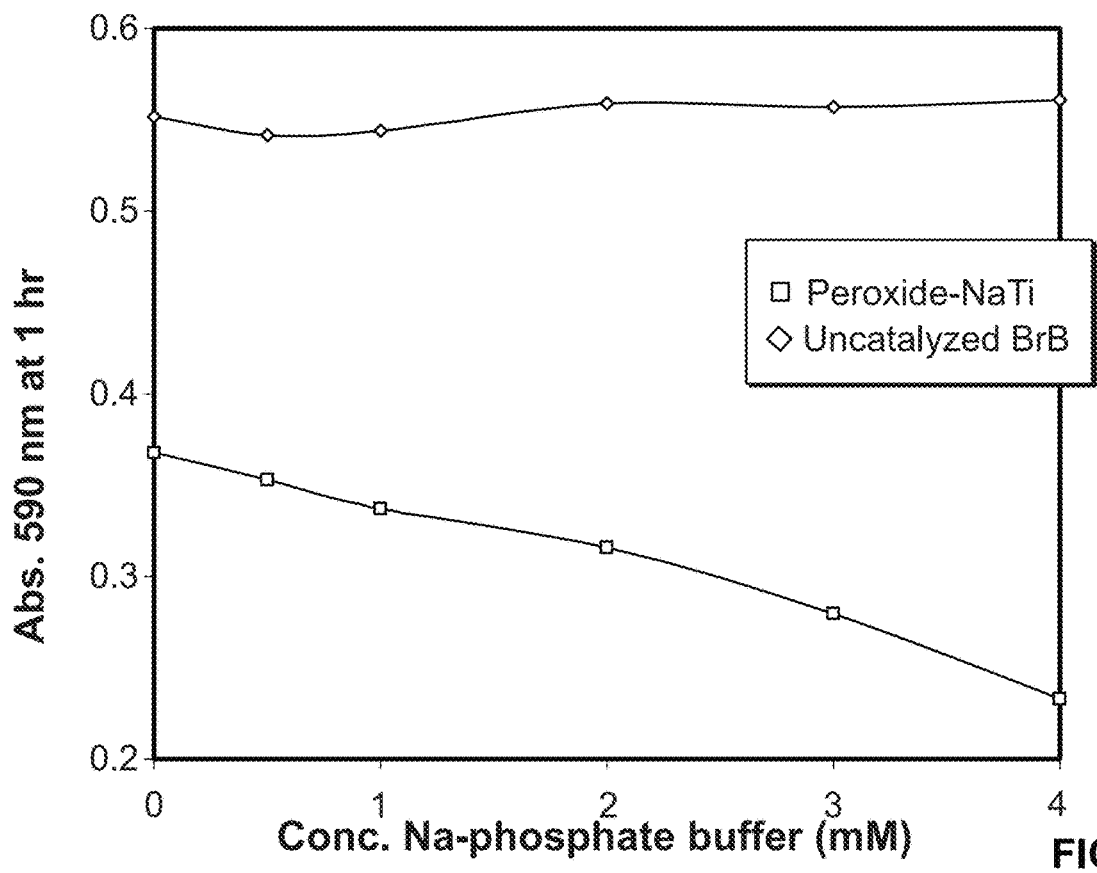
FIG. 14 shows the effect of escalating level of phosphate buffer on photocatalytic degradation of BrB compared with uncatalyzed photo-degradation, with all data points at one hour of UV exposure, according to an embodiment of the disclosure. Lower absorbance indicates a faster rate of depletion. (Triplicate values varied within ±0.010 AU of mean at each point.).

In shifting the testing program from an acidic to a pH 8 environment, different buffers were evaluated. In an experiment that compared 5 mM sodium phosphate, sodium bicarbonate, and sodium borate buffers at pH 8.0±0.1, the depletion of BrB by delaminated titanate catalysis appeared to be enhanced in the phosphate by about 28 percent (with N=4, NaTi catalyst depleted BrB an average of 51.5±2.5% in borate and bicarbonate vs. 66±1% in phosphate in one hour) while this effect was not seen in TiO$_2$. Several experiments were performed to confirm this phenomenon occurring for both the sodium- and cesium-derived catalysts, including an escalation of the phosphate content of 5 mM sodium bicarbonate buffer with the pH constant at 8.0 (see FIG. 14). This resulted in a clear dose effect, while no such trend appeared in degradation of BrB without catalyst, exposed to UV light in the same buffer series.

Characterization of the different delaminated titanates via standard techniques such as X-ray diffraction, infrared spectroscopy and various microscopies (TEM, AFM, SEM) did not reveal obvious differences between the materials that we could link to variations in catalytic efficacy. UV-vis spectroscopy, measuring the adsorption bandgap energy, seemed the most sensitive technique in detecting differences between materials.

Figure 15:
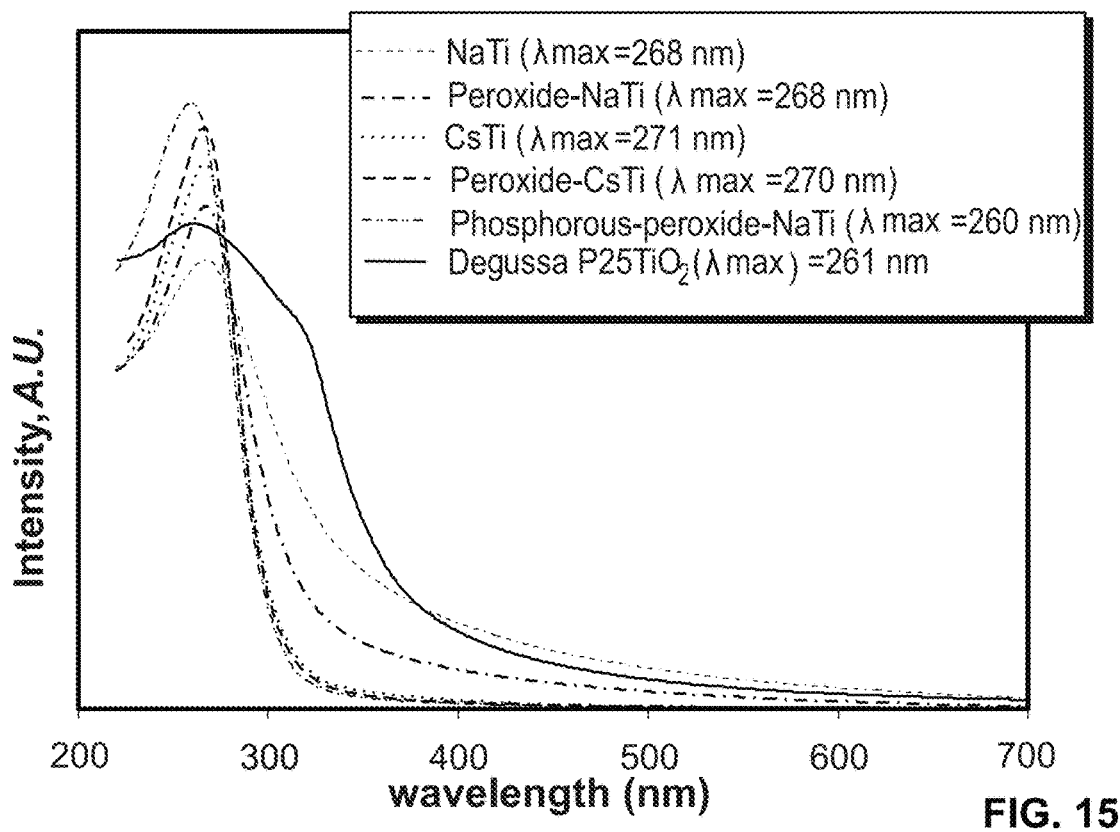
FIG. 15 shows the UV-vis spectra of aqueous suspensions of the delaminated titanate photocatalysts, Degussa P25™ TiO$_2$, and phosphate-modified delaminated titanate, according to an embodiment of the invention. Adsorption maxima (nm) for each phase is in parenthesis.

FIG. 10 shows the UV-vis spectra for delaminated titanates NaTi, peroxide-NaTi, CsTi, peroxide CsTi and phosphate-treated NaTi. The peak adsorption is very similar for NaTi, CsTi, peroxide-NaTi and peroxide-CsTi. The major difference however is the NaTi and peroxide-NaTi materials both have a broader shoulder into the visible wavelengths and decreased intensity; peroxide-NaTi in particular. Differences between the delaminated titanates were not significant at most points, but differences between their activity rates from one concentration to the next were significant except between 20 and 40 µg/ml, as were the activity differences for TiO$_2$, except between 60 and 80 µg/ml. Since these materials all have similar photocatalytic behavior for MO degradation, this suggests it is the peak adsorption that is important; where the UV source we utilize emits at 254 nm. However, this is a strong indication of structural differences between the titanate layers derived from SNT and from Cs-titanate; most likely in Ti-vacancy or defect concentration. The phosphate-treated peroxide-NaTi has a maximum adsorption at 260 nm, as well as a broader shoulder towards lower wavelength and, therefore, the bandgap is better matched to the UV source. This may explain the enhanced performance, although we have not been able to discern distinct structural, morphological, or compositional changes that accompany this enhanced performance. Although the Degussa P25 TiO$_2$ is a poorer catalyst than all of the delaminated titanates, it also has an adsorption maximum at 261 nm (see FIG. 15); which is not consistent with the interpretation of the enhanced performance of phosphate-treated peroxide-NaTi. However, TiO$_2$ it is a different material with lower surface area; so a direct comparison is not meaningful. The term 'surface area' in this context simply describes the geometrical differences between a sheet and a sphere: a sheet has higher surface:volume ratio. No surface areas were measured since the photocatalysis takes place in an aqueous colloid; and the necessity to perform these measurements on dried material renders the measurements meaningless.

The photocatalytic activity of TiO$_2$ and mesoporous TiO$_2$ may be improved by doping TiO$_2$ with approximately 1% phosphorous, presumably by increasing surface area and creating surface traps to delay $e^-/h^+$ recombination. This effect was not observed in prior experiments with Degussa P25 TiO$_2$. However, the method of introduction of the phosphorous to the titanate materials was different. In the prior experiments, the phosphate was introduced before forming the TiO$_2$ via calcination. According to the present disclosure, phosphorous was introduced only in the aqueous phase, so it would be incorporated into the delaminated titanates via surface adsorption or reaction with the surface. The surface of layered titanates is likely more reactive towards phosphate adsorption/reactivity than the TiO$_2$.

Finally, the broad shoulder towards the visible wavelengths of the NaTi and peroxide-NaTi spectra indicate these materials may be more effective for photocatalysis compared to the CsTi materials, if a longer wavelength source was utilized in the application.

In summary, sodium nonatitanate-derived delaminated nanosheets are comparable in photocatalytic activity with Cs-titanate-derived catalysts. This is probably because the construction of the layers, edge-sharing TiO$_6$ octahedra is similar for the two materials. The SNT-derived materials are very attractive for further development, since both their initial synthesis and processing is much simpler: From initial synthesis to final delamination, SNT requires approximately three processing steps compared to seven-nine steps for Cs-titanate. The primary differences are in the initial synthesis and the acidification prior to delamination.

Furthermore, sodium is much less costly than cesium. Since SNT is synthesized hydrothermally and Cs-titanate is synthesized via solid-state processing, both have advantages and disadvantages for chemical modifications such as by doping with other elements to enhance activity, selectivity, or shift the absorption band-gap. Both forms were shown to be superior to standard TiO$_2$ when tested as colloidal suspensions under a germicidal UV light. This is probably a combined effect of higher surface area and a shifted bandgap that provides a better match with the UV-source.

Further treatment of these preparations with hydrogen peroxide appears to confer some degree of enhancement in most photodegradation experiments. Treatment with millimolar concentrations of sodium phosphate was seen to accelerate photocatalysis by the delaminated titanates rather significantly. These findings offer some new possibilities of simple chemical modifications to enhance photocatalytic activity.

Figure 16:
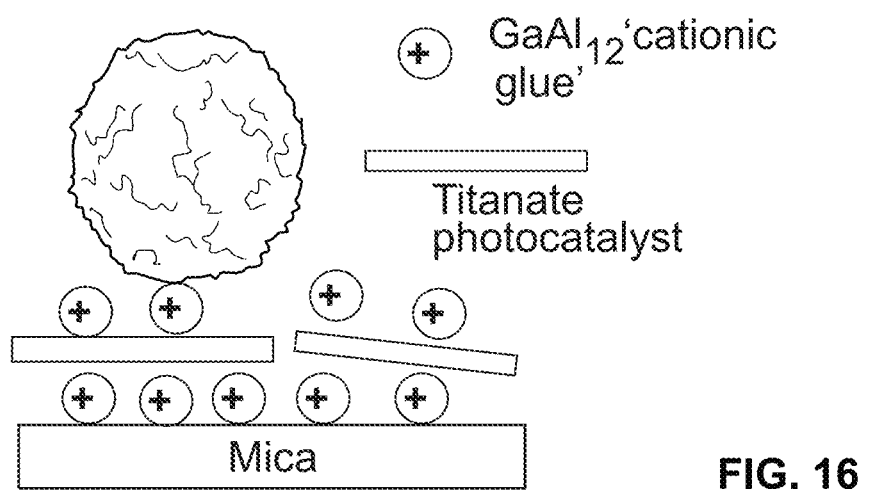
FIG. 16 is an illustration of an assembly of a functional surface on mica for binding a microorganism and photocatalytically destroying the adsorbed species according to an embodiment of the disclosure.

The assembly and function of the entire 'package' of binding component and photocatalyst is now discussed. The titanate photocatalyst and GaAl$_{12}$ cationic glue were assembled on mica surfaces, chosen for their pristine and atomically flat nature that is necessary for Atomic Force Microscopy (AFM) surface imaging and adhesion studies. In another embodiment, the substrate may be membranes such as polyethersulfone, sintered glass, or any material in current or future use in filtration membranes that is or may be rendered refractory to photocatalysis. The cationic function group [GaO$_4$Al$_{12}$(OH)$_{24}$(H$_2$O)$_{12}$]$^{7+}$ polycation was utilized to both adhere the titanate sheets to the mica surfaces, as well as provide an electrostatically attractive surface for the microorganism such as MS2 bacteriophage. In another embodiment, other functional groups may be used. Therefore, a cation-anion-cation multilayered sandwich is assembled on the mica, see FIG. 16.

The photocatalysts remain active in the surface adsorbed state. MS2 adsorbed to 1) $GaAl_{12}$ polycation only, and 2) $GaAl_{12}$-titanate-$GaAl_{12}$ were imaged. The photocatalytic destruction of the phage was demonstrated.

Other experiments were designed to determine whether delaminated titanates could be bound to a solid surface and retain photocatalytic ability. To this end, Cs- and Na-derived, delaminated titanates were bound to freshly-exposed muscovite mica (Ted Pella) surfaces that had been previously coated with $[GaO_4Al_{12}(OH)_{24}(H_2O)_{12}]^{7+}$ polycations, denoted $GaAl_{12}$, synthesized as described prior. Four 1-inch square mica pieces coated only with $GaAl_{12}$ (at 1 mg/mL in deionized water, with five minutes contact) and four with $GaAl_{12}$ followed by a coating with the titanate were rinsed thoroughly with deionized water and dried at room temperature. Each piece was placed beneath 0.5 mL of $2.5\times10^{-5}$ M MO and exposed to UV light for three hours, after which all of each MO load was recovered with limited rinsing, the final volumes equalized, and their absorbance was read to determine the amount of dye remaining.

Although several procedures and conditions were employed experimentally, the most successful protocol for adsorbing MS2 viruses to mica was the following. Mica (Ted Pella, Hi-Grade) was cleaved with a new scalpel blade and immediately immersed in $GaAl_{12}$ (1000 ppm Al, pH 4.5 in water) for 10 minutes, then rinsed with purified water and allowed to dry. Subsequent coatings were achieved by applying the desired solution or suspension dropwise to the upper, newly cleaved and treated surface for a total of 0.5 mL on a 1-inch square of mica. After ten minutes, the liquid was aspirated from the mica, which was then rinsed with purified water and allowed to dry.

MS2 virus solutions used for coating were assayed at 0.2 to $1.0\times10^{10}$ viable pfu/mL in 0.01 M phosphate buffer, pH 6. However, due to the serial subculturing used to generate the virus stock and the natural attrition rate of MS2, it is likely that viable viruses were greatly outnumbered by noninfectious capsids. For adsorbing MS2 onto titanate sheets, the delaminated titanate was applied to mica first, than counter-coated using a second treatment with $GaAl_{12}$. After ten minutes, unbound $GaAl_{12}$ was rinsed off, and MS2 solution was applied dropwise as described minutes, unbound $GaAl_{12}$ was rinsed off, and MS2 solution was applied dropwise as described.

Tapping mode atomic force microscopy (AFM) using a Veeco Dimension 5000 Tool was used to examine surface-adhered titanate layers and MS2 adsorbed onto cleaved mica surfaces. With this AFM the mica substrate root mean square roughness was measured at 50 pm in a 1 um scanned area, indicating a noise floor for the system. Height and distance calibration was verified using standard calibration samples.

The use of colloidal suspensions of the titanate nanosheets is convenient for screening experiments utilizing different materials, conditions and contaminants; but surface-bound titanates have greater potential for practical use in remediating organic and microbial contamination in water. Furthermore, the delaminated titanate layers have the ideal morphology for adsorption onto a flat surface. A binding component or coupling agent may be used to affix the nanosheets to high-quality mica surfaces (specifically for AFM characterization). The titanate layers are anionic under most pH conditions, and therefore we considered cations that would adhere readily to the anionic mica surface when deposited from an aqueous solution. While organic cations can be utilized (polymers for instance), they might themselves be vulnerable to catalytic photo-oxidation. Inorganic polycations may be used as an adherence layer. Use of the aluminum tridecamer $[AlO_4Al_{12}(OH)_{24}(H_2O)_{12}]^{7+}$ ($Al_{13}$) has in fact been reported for exactly this purpose. (34) However, prior studies have shown that the related Ga-centered aluminum cluster, $[GaO_4Al_{12}(OH)_{24}(H_2O)_{12}]^{7+}$, $GaAl_{12}$ is more stable and carries a higher charge in aqueous solution, (1) so we opted to utilize this 'cationic glue' instead.

Figure 17A:
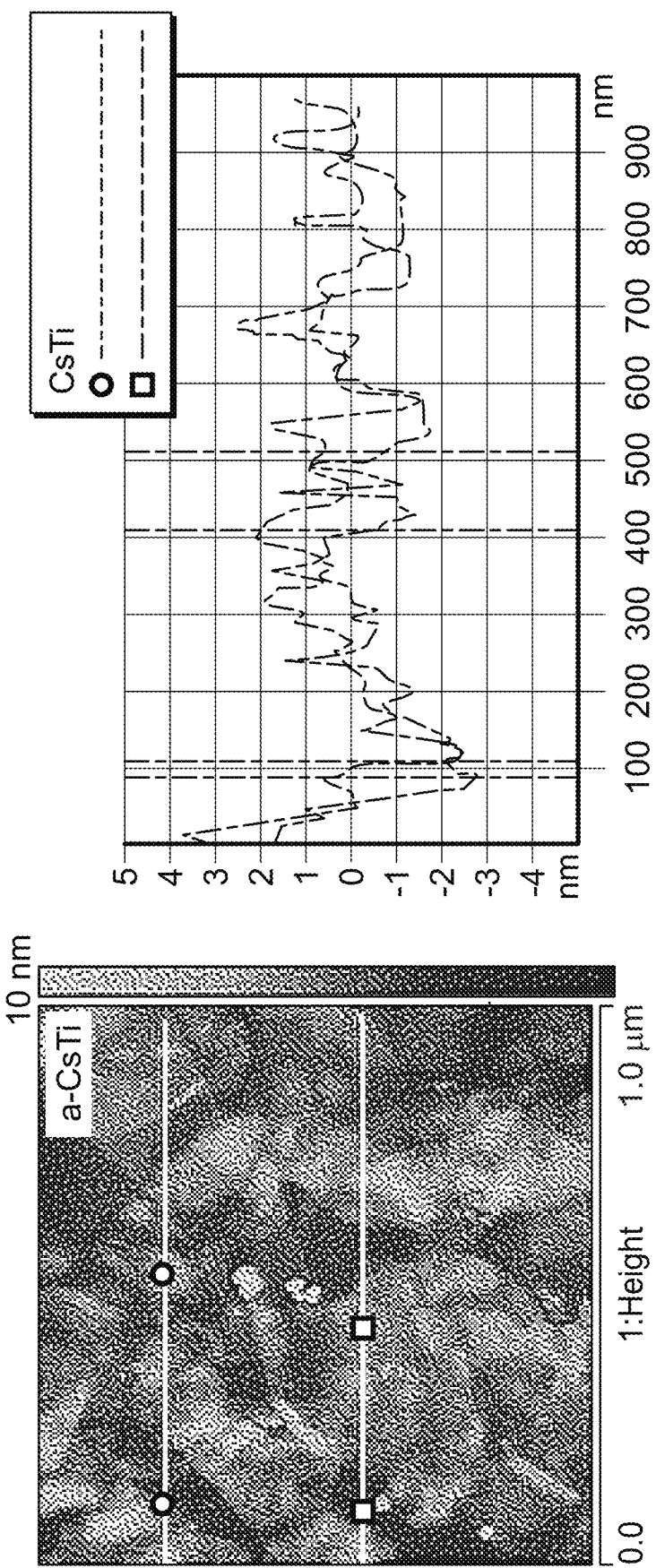
FIG. 17A is an AFM image of delaminated layers derived from Cs titanate. Mica surfaces are pre-treated with GaAl$_{12}$ polycation. Height profiles for across the section denoted by circles and squares are shown in the center panel.
Figure 17B:
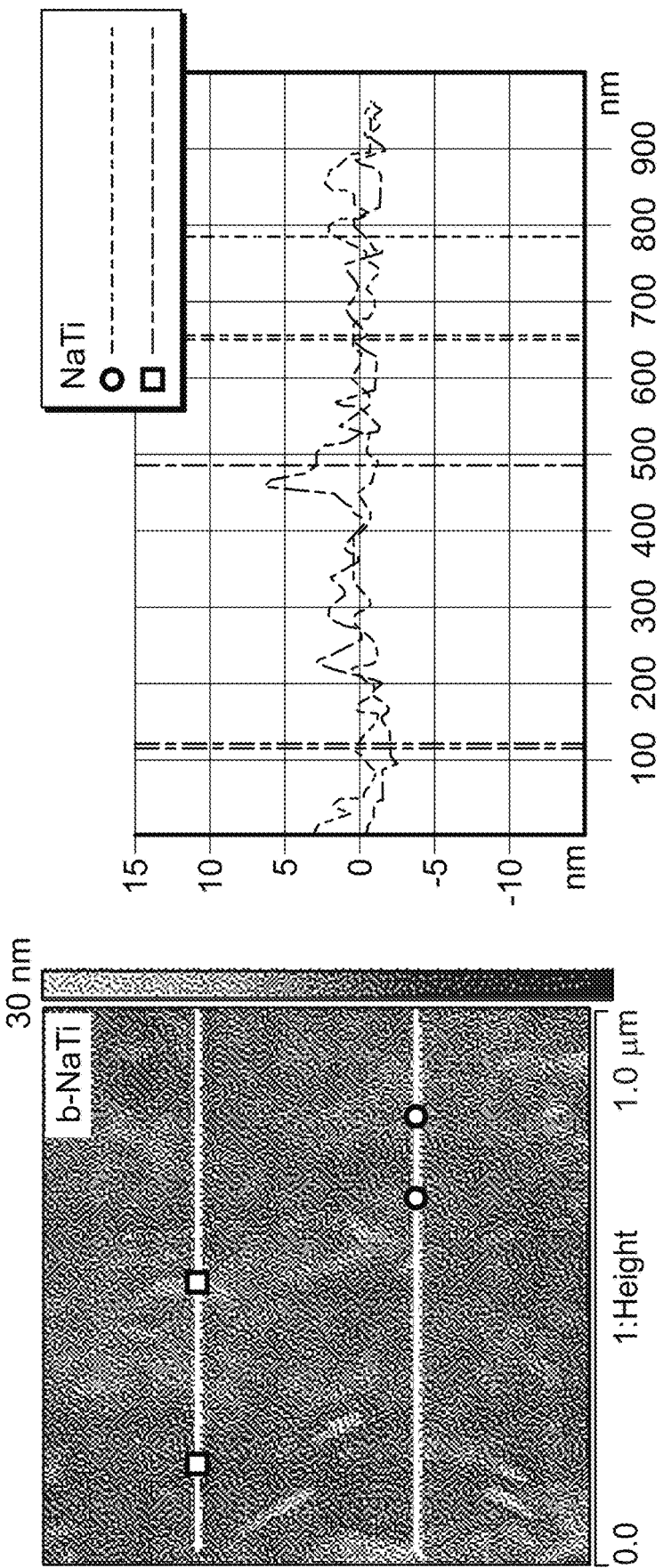
FIG. 17B is an AFM image of delaminated layers derived from SNT. Mica surfaces are pre-treated with GaAl$_{12}$ polycation. Height profiles for across the section denoted by circles and squares are shown in the center panel.

Dense coverages of delaminated titanate from both CsTi and NaTi, as well as the peroxide derivatives, were assembled on $GaAl_{12}$-coated mica surfaces. Typical CsTi and NaTi coatings imaged by AFM are shown in FIGS. 17A and B, respectively. Morphologies differences are apparent. Qualitatively, the CsTi derived coatings are more sheet-like, whereas the NaTi layers can be described as more fibrous. Two profiles are shown for each image; the CsTi layers and the NaTi layers. The maximum height difference is 4 nm for both the CsTi and NaTi layers. The double-layer of edge-sharing $TiO_6$ octahedra of the Cs-titanate phase is approximately 0.4 nm thick; and the $GaA_{12}$ polycation is approximately 1 nm in diameter. It may be assumed that the titanate layers of SNT have similar structure, and a corresponding similar thickness. Therefore, the dense layers shown in FIGS. 17A and B are fewer are than 10 titania-layers thick. It is not clear from these studies if TBA resides between some co-adsorbed titania layers.

Figure 18:
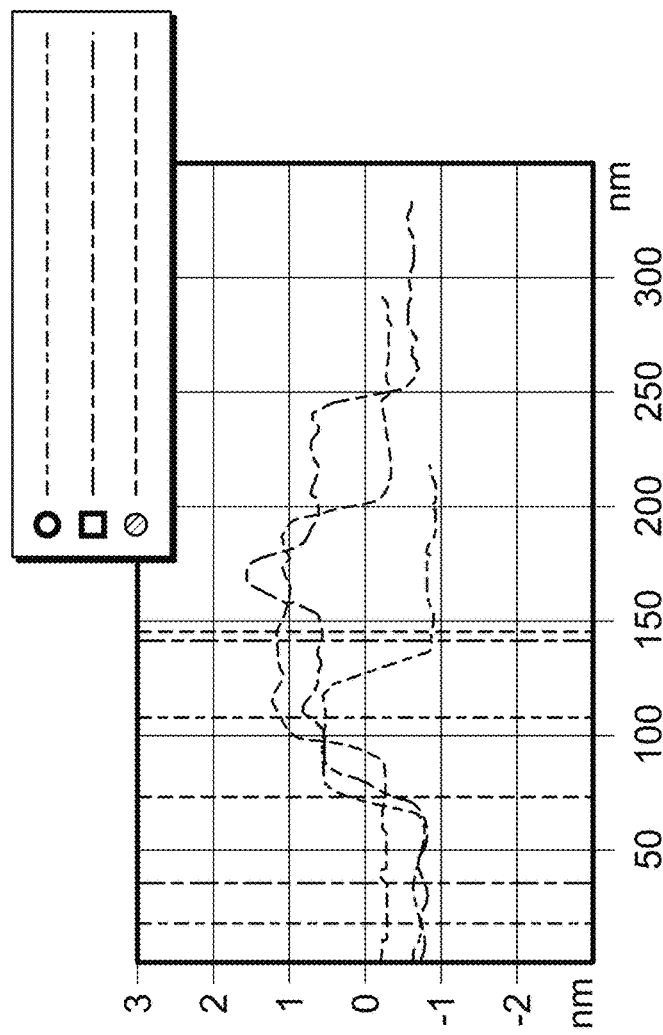
FIG. 18 is an AFM image and height profile of Cs-titanate layers adsorbed onto mica with pretreatment with GaAl$_{12}$ according to the present disclosure. Circles, squares and shaded circles denote corresponding cross sections shown in the height profile.
Figure 18:
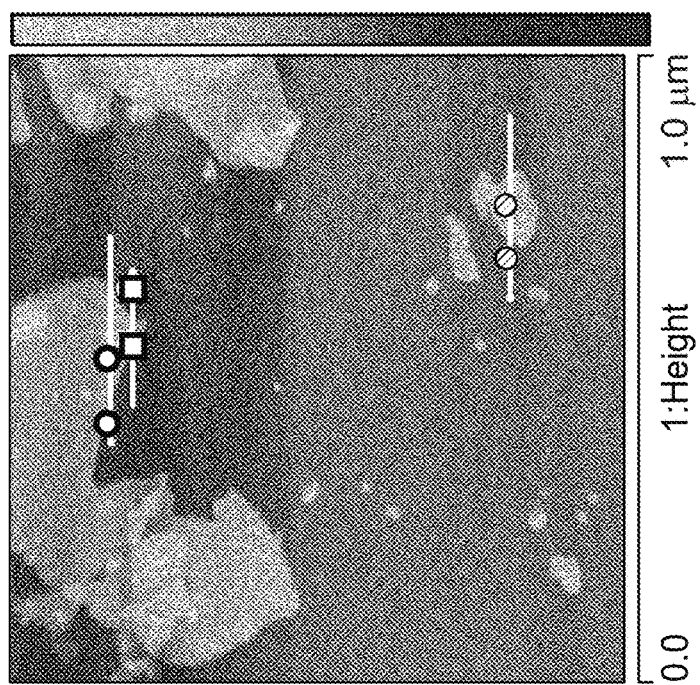

FIG. 18 is an AFM image of mica immersed in a delaminated titanate colloid without pretreatment with the polycation. As can be seen in FIG. 18, the image only shows a very sparse coating of titanate. A single adsorbed titanate layer of approximately 1 nm was observed. This is approximately twice the thickness of the double-layer of $TiO_6$ octahedra of the Cs titanate structure. However, in this case where there is no pre-treatment with $GaAl_{12}$, it is likely that some TBA-cations are co-adsorbed between the mica and the titanate layer.

Figure 19:
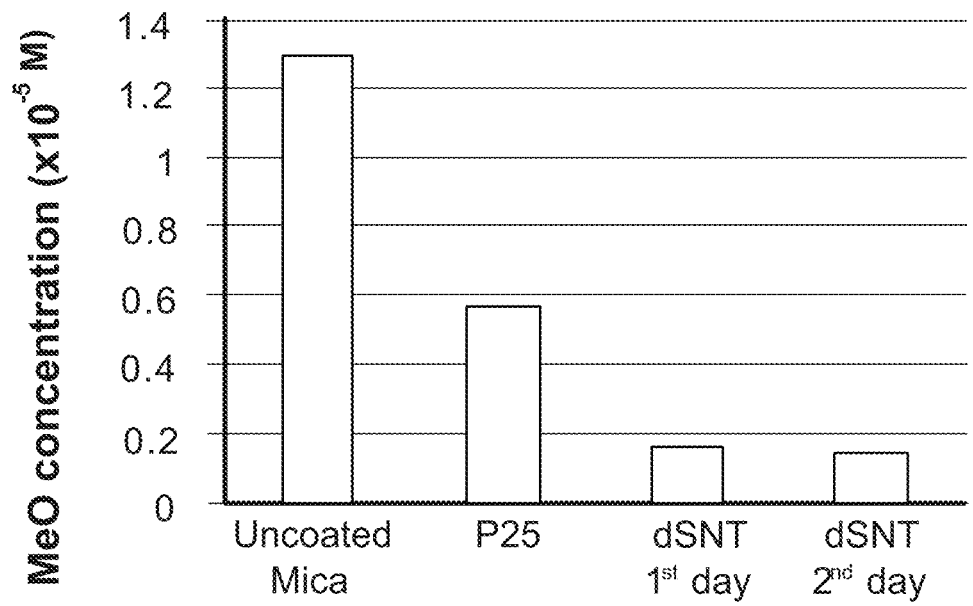
FIG. 19 is a chart comparing the photocatalytic activity via methyl orange degradation of Degussa P25 TiO$_2$ and titanate nanosheets, both adsorbed onto mica substrates.

Photocatalytic degradation of methyl-orange utilizing layers derived from SNT affixed on mica surfaces demonstrated these catalysts are also functional in this form. Average remaining concentration of MO after the first UV exposure of the solid-phase catalyst squares was $0.16\times10^{-5}$ M as oppose to the control squares with $1.30\times10^{-5}$ M MO remaining, a reduction of 88% for three hours exposure time. The photocatalytic activity of Degussa P25 $TiO_2$ was demonstrated for comparison and these are compared in FIG. 19.

The $TiO_2$ nanoparticles reduced the MO concentration to around 56%, again demonstrating the superior performance of the titanate nanosheets. The same mica pieces were rinsed off with deionized water, dried overnight, and used the next day in a repeat experiment. In the second trial of the same surfaces without additional coating, the remaining MO concentration recovered from the titanate squares was $0.14\times10^{-5}$ M as oppose to the control squares with $1.29\times10^{-5}$ M MO remaining, a reduction of 89%, again over three hours. There is no loss in photocatalytic activity, demonstrating the robust nature of these materials, and the appropriate choice of an inorganic 'glue' to bind the anionic titanate layers to the anionic substrate. Although mica was chosen to optimize conditions for AFM imaging, most filtration substrates or media are in fact anionic, so the inorganic polycation is important for more practical applications as well.

Figure 20A:
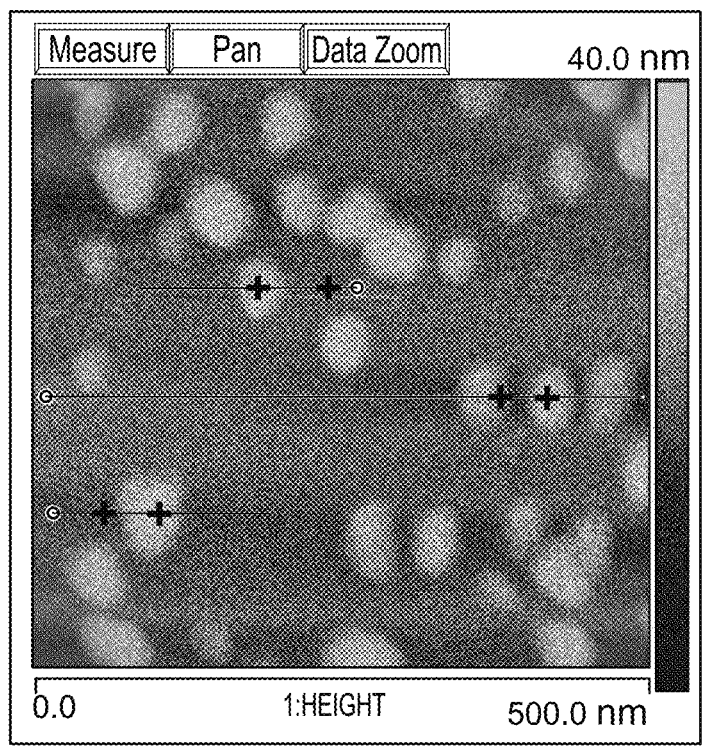
FIG. 20A shows an image of the MS2 adsorbed onto a mica surface treated with GaAl$_{12}$ polycation only according to the present disclosure.
Figure 20B:
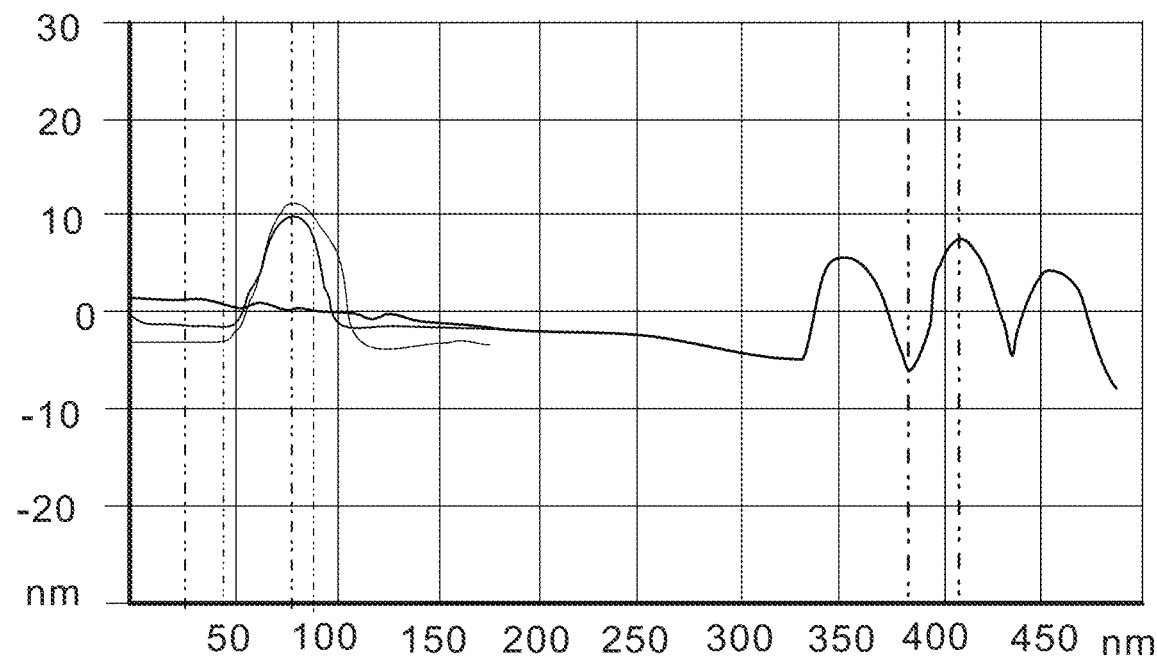
FIG. 20B shows the height profile of FIG. 20A showing 'flattened' phage bodies, with a height above the mica of 12-15 nm and a width, parallel to the surface of around 40 nm are observed.

FIG. 20A shows an image of the MS2 adsorbed onto a mica surface treated with $GaAl_{12}$ polycation only. The MS2 phage has a diameter of 27 nm. As can be seen in FIGS. 20A-C, 'flattened' phage bodies, with a height above the mica of 12-15 nm and a width, parallel to the surface of around 40 nm are observed. This suggests the adherence to the cationic surface is quite strong.

Figure 21:
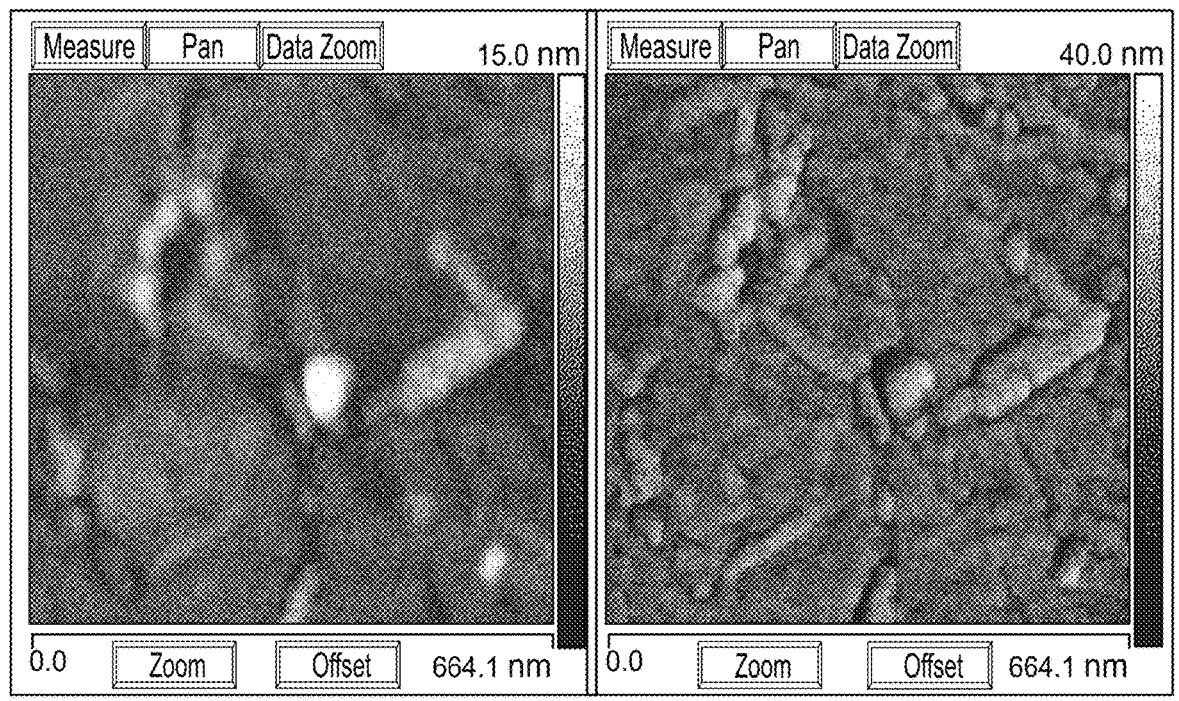
FIG. 21 shows MS2 adsorbed onto a surface that has been functionalized with a GaAl$_{12}$-titanate-GaAl$_{12}$ multi-layer before (top) and after (bottom) photocatalysis according to an embodiment of the invention.
Figure 21:
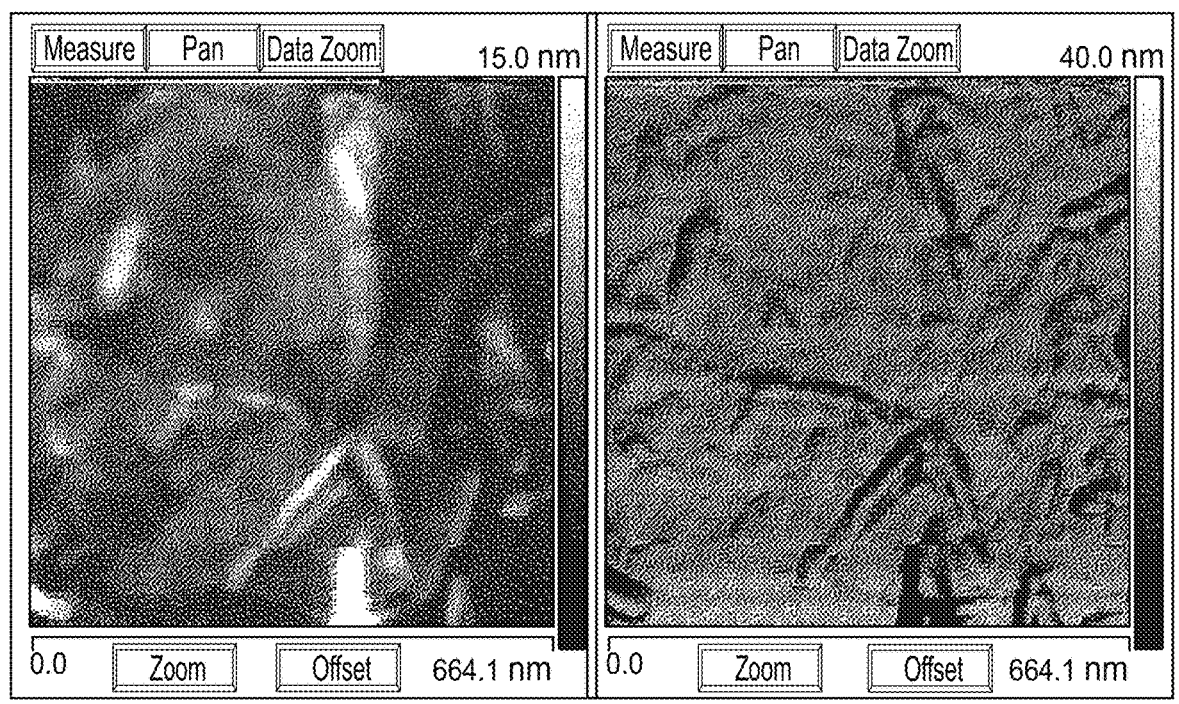

FIG. 21 shows the MS2 adsorbed onto a surface that has been functionalized with a $GaAl_{12}$-titanate-$GaAl_{12}$ multilayer before (top) and after (bottom) photocatalysis. The photocatalytic activity of the titanate sheets destroyed the phage within 30 minutes of UV-irradiation.

The disclosure is further directed to using delaminated titanates for selectively precipitating rare-earth metals out of solution. This is a property of delaminated titanates that is neither photocatalytic nor necessarily surface-bound. Rare-earth metals (RE) are used extensively in hybrid vehicles, wind turbines, 'supermagnets' and display and lighting applications. Given the current shortage of rare-earths on the global market, issues around mining, separating and recycling rare-earths have become exceedingly important. Sorption and precipitation of rare-earths may be applied in recycling of rare-earths, cleaning mine drainage, and other mining separation processes.

Figure 22:
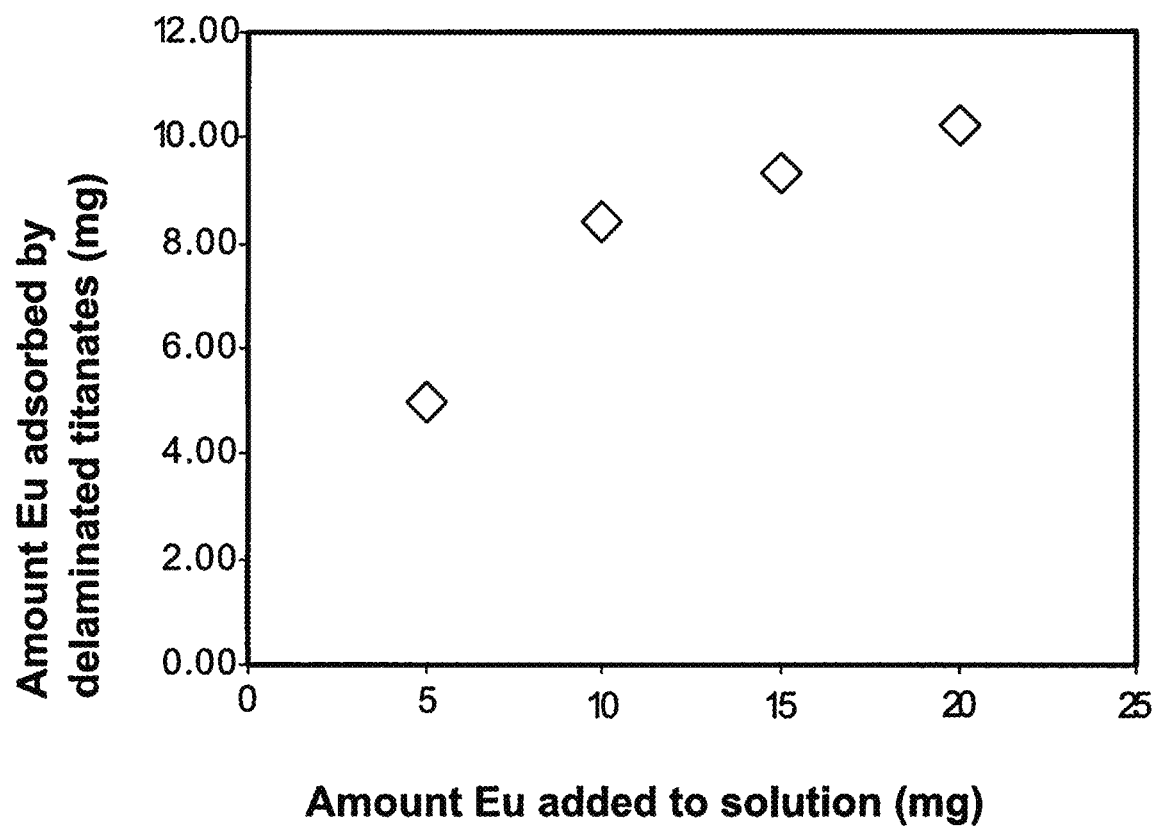
FIG. 22 is a chart showing Eu removal from an aqueous solution (35 ml) via 100 g delaminasted titanate as a function of Eu concentration in the solution.

FIG. 22 shows the adsorption of Eu from solution via delaminated titanates as a function of amount of Eu in solution, to determine a 'breakthrough curve', for the removal of EU from aqueous solution (35 ml) via 100 g delaminated titanate, as a function of Eu concentration in a solution. A maximum of 10 wt % Eu is adsorbed by the delaminated titanate. Given an approximate formulae of $[TBA]_3[Ti_3O_{7.5}].3H_2O$ (TBA=tetrabutylammonium), the delaminated titanates can theoretically adsorb 17 wt % RE, Eu and in this example, 10 wt % Eu is adsorbed.

It was also determined that the titanate layers can be recycled for reuse. The Eu can be removed with acid, the titanate delaminated again, and reused for Eu sorption. This cycle is summarized in the equation below:

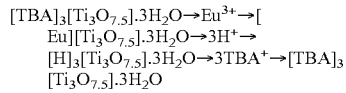

It should be noted that in a solution with sodium as a competitive ion (200:1 Na:Eu ratio), the Eu is removed selectively: 92% of the Eu is removed, indicating that successful uptake of rare earth elements is practical from saline waters.

While the disclosure has been described with reference to a preferred embodiment, it will be understood by those skilled in the art that various changes may be made and equivalents may be substituted for elements thereof without departing from the scope of the disclosure. For example, telescoping or linear devices may be hydraulically driven, and/or these devices may be driven with hydraulics, air, water, or electricity or any combination thereof.

In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the disclosure.

What is claimed is:

1. A method for capturing a contaminant, the method comprising
    exposing a fluid stream comprising a concentration of a contaminant to a functionalized component comprising a high charge density binding component to reduce the concentration of the contaminant in the fluid stream;
    wherein the functionalized component comprises
    a substrate having a surface;
    the high charge density binding component attached to the surface and capable of binding a microorganism or organic molecule or organic material thereto; and
    a photocatalyst bound to the high charge density binding component;
    wherein the photocatalyst comprises a delaminated sodium nonatitanate;
    and wherein the high charge density binding component comprises aluminum or gallium polycationic clusters.

2. The method of claim 1, wherein the substrate is porous.

3. The method of claim 1, wherein the substrate is transparent.

* * * * *